US009599479B2

United States Patent
Kreft

(10) Patent No.: US 9,599,479 B2
(45) Date of Patent: Mar. 21, 2017

(54) BROADCAST MAP PROGRAM METHOD EMPLOYING POINT-OF-INTEREST, GEO-COORDINATE VALIDATION BY A TRUSTED PERSON

(71) Applicant: Never-Search, Inc., Cupertino, CA (US)

(72) Inventor: Keith Kreft, Cupertino, CA (US)

( * ) Notice: Subject to any disclaimer, the term of this patent is extended or adjusted under 35 U.S.C. 154(b) by 0 days.

(21) Appl. No.: 14/919,901

(22) Filed: Oct. 22, 2015

(65) Prior Publication Data

US 2016/0054134 A1    Feb. 25, 2016

Related U.S. Application Data

(63) Continuation of application No. 14/177,096, filed on Feb. 10, 2014, now Pat. No. 9,177,330, which is a continuation of application No. 13/545,962, filed on Jul. 10, 2012, now Pat. No. 8,649,976, which is a continuation of application No. 12/107,633, filed on Apr. 22, 2008, now Pat. No. 8,219,318, which is a continuation of application No. 11/110,976, filed on Apr. 19, 2005, now Pat. No. 7,373,244.

(60) Provisional application No. 60/563,639, filed on Apr. 20, 2004.

(51) Int. Cl.

| G01C 21/26 | (2006.01) |
| G01C 3/08  | (2006.01) |
| G01C 21/32 | (2006.01) |
| G06Q 30/02 | (2012.01) |
| G01C 21/00 | (2006.01) |
| G06T 11/60 | (2006.01) |

(52) U.S. Cl.
CPC ............... *G01C 21/26* (2013.01); *G01C 3/08* (2013.01); *G01C 21/00* (2013.01); *G01C 21/32* (2013.01); *G06Q 30/0251* (2013.01); *G06Q 30/0259* (2013.01); *G06T 11/60* (2013.01)

(58) Field of Classification Search
CPC ........... G06F 17/30241; G06F 17/3053; G01C 21/367; G01C 21/26; G01C 21/3682
USPC ......... 701/445, 425, 426; 707/723, 770, 812
See application file for complete search history.

(56) References Cited

U.S. PATENT DOCUMENTS

| 6,240,360 B1 * | 5/2001 | Phelan ............... G01C 21/26 345/641 |
| 6,493,630 B2 * | 12/2002 | Ruiz ................. G09B 29/006 340/989 |
| 7,486,958 B2 * | 2/2009 | Sheha ............... H04L 29/12066 379/142.1 |
| 2002/0002552 A1 * | 1/2002 | Schultz ............... G06F 17/3087 |
| 2003/0061211 A1 * | 3/2003 | Shultz ................ G06F 17/3087 |

* cited by examiner

*Primary Examiner* — Dalena Tran
(74) *Attorney, Agent, or Firm* — Edward P. Heller, III

(57) ABSTRACT

An map display method wherein a point of interest is displayed on a map, the geo-coordinates updated by a trusted person and then stored for subsequent display to the displays of a plurality of different computers such as through the internet.

10 Claims, 25 Drawing Sheets

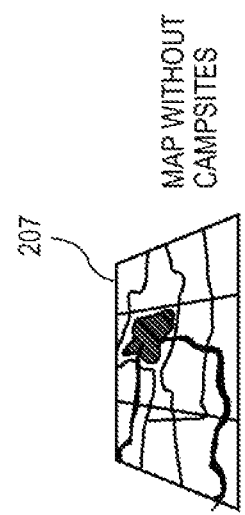
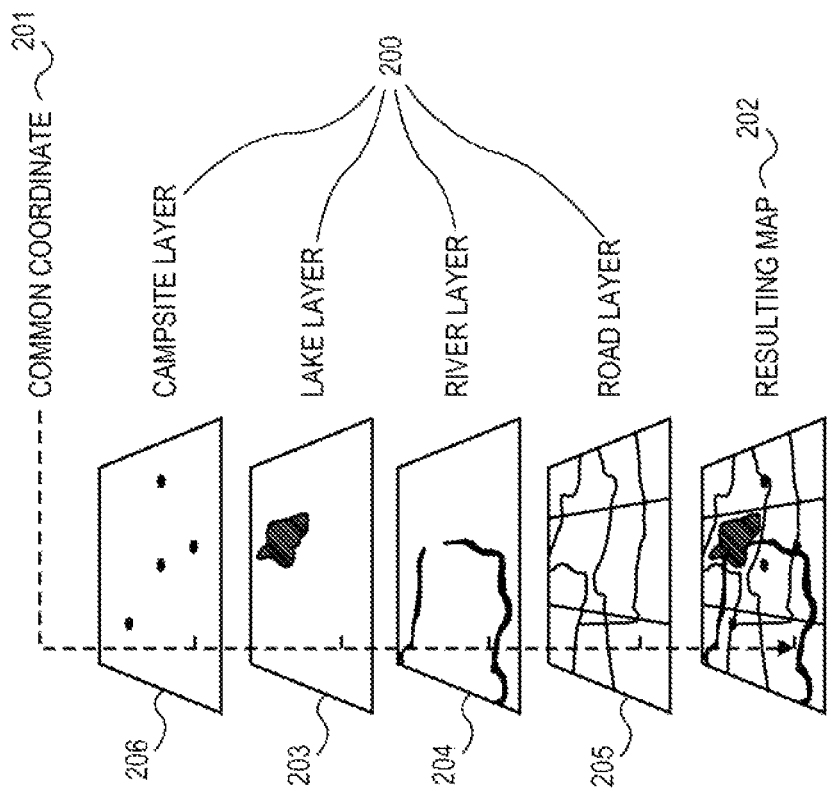

FIG. 19

BROADCAST MAP PROGRAM METHOD EMPLOYING POINT-OF-INTEREST, GEO-COORDINATE VALIDATION BY A TRUSTED PERSON

BENEFIT CLAIM

This application claims the benefit under 35 U.S.C. §120 as a Continuation of prior application Ser. No. 14/177,096 filed Feb. 10, 2014, which is a continuation of prior application Ser. No. 13/545,962, filed Jul. 10, 2012, now U.S. Pat. No. 8,649,976; which is a Continuation of prior application Ser. No. 12/107,633, filed Apr. 22, 2008, now U.S. Pat. No. 8,219,318, which claims the benefit under 35 U.S.C. §120 as a Continuation of prior application Ser. No. 11/110,976, filed Apr. 19, 2005, now U.S. Pat. No. 7,373,244, and which claims benefit under 35 U.S.C. §119(e) of U.S. Provisional Application No. 60/563,639, filed Apr. 20, 2004, the entire contents of each of which is hereby incorporated by reference as if fully set forth herein.

FIELD OF THE INVENTION

The present invention generally relates to computer-based approaches for information mapping. The invention relates more specifically to approaches for creating and displaying maps for travel, business or other purposes.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Today, an extra-ordinary amount of time is spent "locating places"—a business traveler looking for a client's office, a good restaurant for dinner, a coffee shop to stop at before the first morning meeting, or a golf course to entertain a client on; a resident in a metropolitan area looking for a particular type of store carrying a particular item, or a fast-food restaurant in a certain section of town; a salesman or delivery person planning a day's route; or a vacationer looking for places to visit, places to stay, places to eat— anything and everything a person might desire to experience while on vacation. Searching for places in unfamiliar areas is time consuming. Ironically, we often find ourselves searching for the same place, or same type of place, in the same unfamiliar area at a later point in time. The process of finding and selecting a place, equally involves both the "what" and the "where." In the process to narrow down selections, candidates are qualified and picked by both meeting the requirements of what is needed, and their location or proximity to where the need is. Often to review both the "what" and the "where," for multiple candidates at the same time, requires a search of multiple information sources, while flipping back and forth between the information sources to make an assessment. The ability to quickly locate and view both qualifications and locations of multiple candidates simultaneously would be beneficial.

Some of the most popular tools used for locating and/or qualifying a POI include; telephone directories—both the white and the yellow pages, printed maps, printed travel guides, and Internet searching and mapping. Other popular locating tools include electronic travel and business maps as found on PC's, palm devices, and in-vehicle systems, and communications devices, like a telephone, where, for example, a call is made for information and/or directions. In some scenarios, the communications may be wireless and may not require voice. Tools are chosen based their effectiveness in accomplishing a particular task in the least amount of time. Each of the above mentioned tools has its own benefits and shortcomings.

Tools with the most promise involve the use of digital maps, where the benefits of viewing various locations by proximity can be realized. This requires the address of the location to be converted to a place on the map, using a process called address geocoding, and a high degree of emphasis has been placed on development of this. Address geocoding is a process of creating or calculating a set of geographic coordinates (latitude and longitude) from a street address, using what Geographic Data Technology, Inc. (GDT) refers to as an Address Coding Guide (ACG). An ACG consists of sets of files that provide city, state, and zip code data needed to locate addresses. It also contains street segment information that includes the street name and starting and ending house number for both odd and even numbered sides of the street. The ACG also contains information designed to compensate for the fact that addresses, address abbreviations, locality names, and so on, have many variations, and that some streets may be referenced by more than one name. It generally contains a spell correction program to fixes errors such as one letter differences, extra spaces, missing spaces, transposed characters, etc.

The ACG also incorporates an address-match strategy that can be set from aggressive to conservative. As one party describes this, "The Conservative strategy follows the strictest set of rules. At the other extreme, the Aggressive method uses the most flexible rule set for finding addresses. In other words, it is able to find more addresses at the expense of accuracy. The differences among the strategies are illustrated in the following examples. In the first example, you want to find the location of the house address 420 James St., but the street database only contains segments for James St. with the ranges of 2-98, 100-198, and 200-298 for the given locality. The Find Address command would not find a match for this address using the Conservative or Normal address-match strategies. With the Aggressive strategy, it would match it to the 200-298 segment because the house address number 420 is within 200 of the house address range on that segment. The software would place the geocoded point on the high end of the segment at the same point where the address 298 James St. would be placed. In a second example, you want to find the house address of 320 James St. As in the previous example, the Normal address-matching strategies would match to the 200-298 segment because that is within 100 of the range on that segment, as would Aggressive. The location of this address would not be found using the Conservative strategy."

The creating or building of an Address Coding Guide is an enormous task. The TIGER database, used by the US Census Bureau in the street level mapping of the US, is generally used as the base for the ACG's in the US, but it is incomplete, and with continuing building construction, updating is needed more often than every 10 years. The capturing of the latitude and longitude coordinates is performed by researchers driving up and down streets with elaborate electronic data collection devices. U.S. Pat. No. 6,687,612 describes one such system that utilizes an electronic glove for interpreting hand and finger gestures of the researcher while the data collection system is being driven around.

Theoretically, once all the roads are mapped into the ACG, any street address can be converted into a latitude and longitude, or what is referred to as a geocode for geographic coordinate, for marking a position on a digital map. In practice, the collection of the latitude and longitude of every road in the US is a massive, labor intensive, and hence expensive task, as evidenced by the patenting of elaborate collection devices. Until this process is completed, if one assumes it can ever be completed with continuing building construction, there will always be holes or errors in the ability of the database to return a correct or accurate geocode for an entered address.

Some have estimated that between 15% and 20% of the addresses attempted to be mapped, are not mapped to an exact numbered street location. Quite often a "best match" is produced, where using more aggressive strategies than described above, the entered address is matched to a zip code, or a city, or to a place along the street where the city or zip code boundary changes. On rarer occasions, the address is matched to the geo-centroid of the state, or the centroid of the US, which is near Alton, Kans. Mapping percentage accuracies decline in rural areas, where roads are more remote, and rural routes without numbers, rural route boxes and PO boxes are used more frequently. Inaccurate matches can be caused by a plethora of things, including; 1) the street and its numbering has not yet been geocoded—vanity addresses, which can be mistaken for driveways, seem to be the last to be captured; 2) the entered address is incomplete—missing either the street number and the street name and the street type; 3) the entered address is, or contains, a PO box, a building number, or a suite number; 4) the entered address contains a spelling error, a typographical error, or an abbreviation not matching the abbreviations used in the database, 5) the street has multiple names, both official and unofficial, and all have not been captured in the database; 6) the official or posted mailing address either does not contain, a street number, or a street name, or it reads "1 mile South of town," or the mailing address is in a different town from which the POI is actually located; 7) a particular region uses an unconventional means of numbering or naming streets, i.e. using dashes or letters within the street number (93-124, or N100), or using numbers within the street name (Avenue 47); and more.

The above geocoding techniques and resulting errors also are found in Internet mapping services, like MapQuest or Yahoo! Maps, in PC-based travel map programs, like Microsoft's Streets and Trips, or Delorme's Street Atlas USA, and in PC-based business map programs, like Microsoft's MapPoint, or ESRI's BusinessMap.

Not all POI's are best located by a street address. Therefore, using a geocoding process exclusively, for finding and locating these POI's, has serious shortcomings. This includes POI's located in an airport terminal, or in a shopping mall, especially where the mall sits further back from the street. For example, the LAX airport has 10 Starbuck's coffee shops in 8 different terminals, all of which have the same address and geocode to the same location in typical map programs. Often all the stores in a mall will have the same address. The travel and business map programs, thus far, have not included any airport terminal or shopping mall building outlines.

The travel mapping and business mapping programs available today boast of including millions of places of business and points of interest, or POI's. While their advertising emphasizes quantity, including the ability of the programs to locate nearby hotels, restaurants, service stations, ATM's, and other POI's, there exists a lack of dependability in use. The included sets of POI's are incomplete and fragmented, POI's are incorrectly classified, and contain duplicate, discrepant and seriously outdated items and data. The approach to deciding which POI's to include can only be described as piecemeal, as if they were cherry picked.

For example, advertising for the 2004 version of one of the more popular travel mapping programs says the program includes 7,000+ golf courses. What they don't advertise, and what the public generally doesn't know, is that almost 18,000 golf courses exist in the US. They don't advertise that 10,000 golf courses, the lion's share, were left out. This same program only included a few hundred Starbuck's coffee locations, when over 6,000 exist in the US, and this is on the fourth annually updated version of the program. These deficiencies are not regular or predictable, and are only discovered during use or by performing a quality check. This general lack of consistency and thoroughness is one of the reasons these programs are not used more frequently and relied upon as a means of locating POI's.

The travel mapping and business mapping programs available today also make it difficult to locate any included POI's on the map. Often, POI's can only be seen, or be fully identified, by zooming in to street magnification level and scouring the map. POI's either disappear or loose their recognizable identities at higher, zoomed-out, levels. How many streets does one need to scour, looking for a coffee house, before concluding their may not be one in the area, or at least not one on the map?

Many, if not all, of the map programs have search features, where one can look for a Starbuck's coffee house, for example. The search can often yield a long listing of stores with the address (street, city and/or state) in which they are located. Often these are listed alphabetically. If one is familiar enough with the area being visited, a nearby street, town or suburb might be recognized by scrolling down the list. However, more often than not, visitors by definition are less familiar with the areas being visited. Browsing though the list, while occasionally highlighting one of the listings to then see if its mapped location looks at all familiar, can be a time consuming and frustrating ordeal.

The POI's included in the mapping programs include many familiar fast-food franchises. When a familiar type of place is viewed on the map, one may know what to expect on a visit. However with some POI's, additional information is often needed before a visit. Golf courses are a good example. Knowing the type of course, public or private, the number of holes, the fees, the degree of difficulty, etc. is essential in deciding where to play. As another example, it would be useful to know more about a restaurant with an unfamiliar name; does it have a drive-up window, or a five star rating? A mapping program might show winery locations, but one needs to go to another source of information or make a phone call to find hours of operation, whether they have wine tasting, and how much the winery charges for this. The standard telephone directory, contact type information of name, address and phone number, currently provided on these mapping programs, is lacking in information to make a decision on whether to further pursue a candidate POI.

Some mapping programs integrate basic "Yellow Pages" listings, where POI searching can be performed by category listing. There are a number of issues with this generalized approach. As mentioned above, there is the thoroughness or completeness issue with the percentage of businesses (POI's) that list in the yellow pages. There are also issues with placing POI's in categories. While a particular POI may be included in the mapping program, it may not be found under the category where one might expect to find it. Is a pizza parlor with a takeout or drive-thru window listed under pizza places, fast-food places or by cuisine under Italian restaurants? Is a golf course with a driving range listed under Golf Courses or Golf Practice Ranges, or both? How is a yellow page Golf Course listing for Discounted Tee Times to be mapped?

The above described piecemeal, slap-it-together, cherry picking practices for including POI's in mapping programs and in in-vehicle systems, have resulted in a lower than expected acceptance of the products as effective POI location tools.

Some map programs allow sets of data with addresses to be imported and mapped. This allows a frequent traveler to create sets of POI's for favorite chains of restaurants or coffee houses, for example. The process involves capturing data and formatting it in a database file compatible with the map program, and then importing it, where the addresses are geocoded. The geocoding process, however, is subject to the same accuracy problems described above, and some programs do a better job than others in informing which points where mapped accurately by street address, and which were mapped to a less accurate location like a city, or zip code, and which were not mapped at all.

Some programs provide the user with mapping location options during the import process, others do not. Some programs identify specifically how each point was mapped, others do not. None of the programs, however, make it easy or convenient to correct the records that were inaccurately mapped, nor do they capture any information on the mapping location options presented during the import process. The address information in the exported data set, where an exporting function is available, is identical to that imported. So the extra time and effort spend in researching and resolving options presented during importing, is lost.

The above process applies similarly to the importing of a business contact file from a contact management, sales force automation, or customer relationship management (CRM) type of program. These contact management programs make it easy to store and find contact information, such as names, addresses and telephone numbers. The more sophisticated, higher-end programs provide reporting functions and allow several people in a workgroup to access the same database of contacts. Microsoft Outlook and ACT! are an examples of contact management programs, while SalesLogix, Gold-Mine, TeleMagic, Maximizer are examples of team-based software packages, which synchronize or centralize the sales automation and CRM functions. Some of the business mapping programs, like MapPoint and BusinessMap, provide links to map the contact database from contact management programs, but the mapping process again requires address geocoding, and is therefore subject to the same accuracy problems described above. Again, none of the programs make it easy or convenient to correct the records that are inaccurately mapped.

Mapping programs fall under the category of GIS (Geographic Information System) programs, which in turn are related to CAD (Computer Aided Design) and CADD (Computer Aided Design and Drafting) programs or development tools, hereafter referred to as just CAD. Many of the more popular GIS programs have evolved from, or merged with CAD programs, or are CAD programs with GIS extensions. In these programs, data is organized and stored into thematic layers in data files.

GIS programs used by infrastructure personnel, city planners and civil engineers at municipalities, have captured and created separate map layers for such things as; water pipes, gas lines, street lights, sewers, storm drains, fire hydrants, traffic lights, cable line, electrical lines.

Some of the earliest CAD applications, dating back to the early 80's, focused on capturing electrical schematics and laying out printed circuit boards (PCB's). The PCB CAD layout programs employed separate layers to capture each set of characteristics of the board, including; the bottom (solder side copper trace) layer, the top (component side copper trace) layer, the physical outline of the printed circuit board, thru hole locations and diameters, the solder mask, and the silk screen legend. These all were registered to the same grid or common coordinate system. PCB designers could view a composite or any combination of layers during the board layout process. The top side copper trace layer was viewed in one color, and the bottom layer traces in another.

There is a significant difference between GIS programs and travel or business map programs, and how they handle POI's. The GIS programs fall more into CAD-based development tools or authoring tools category. GIS programs are used to create and maintain (update) a continuously increasing number of information data layers. These programs have extensive control over the viewing of all the thematic layers, for example; the order in which the layers are viewed (which layer is on top), fading layers in and out, assigning of symbols, colors, and line widths, shading, etc., to any point, line or area (polygon) in any layer. These programs require an extensive amount of training and experience to become proficient in their use.

On the other hand, the travel or business map programs are not design/development tools. They are meant to be simple to use, easy to learn application programs, functioning more like a lightweight GIS data viewer with respect to the POI's supplied in the program. While the POI's included in the travel or business programs can be turned on and off, they cannot be modified, edited, enhanced, deleted or added to by the user.

Some of the travel and/or business mapping programs allow external data records to be imported or linked into their programs. During the import process, address fields are identified to allow geo-coordinates to be developed from the street address. Imported records then appear as pushpins on the map, which can be assigned unique pushpin symbols, or colors, allowing multiple data sets to be imported and remain uniquely identifiable. However, the importing process, and the manipulation, control and display of the imported data in currently available products leaves much room for improvement.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A and B show how maps are comprised of multiple layers.

FIG. 19 shows an improved contact management record with address verification and correction displays.

DETAILED DESCRIPTION

1. Overview

Figure 1:
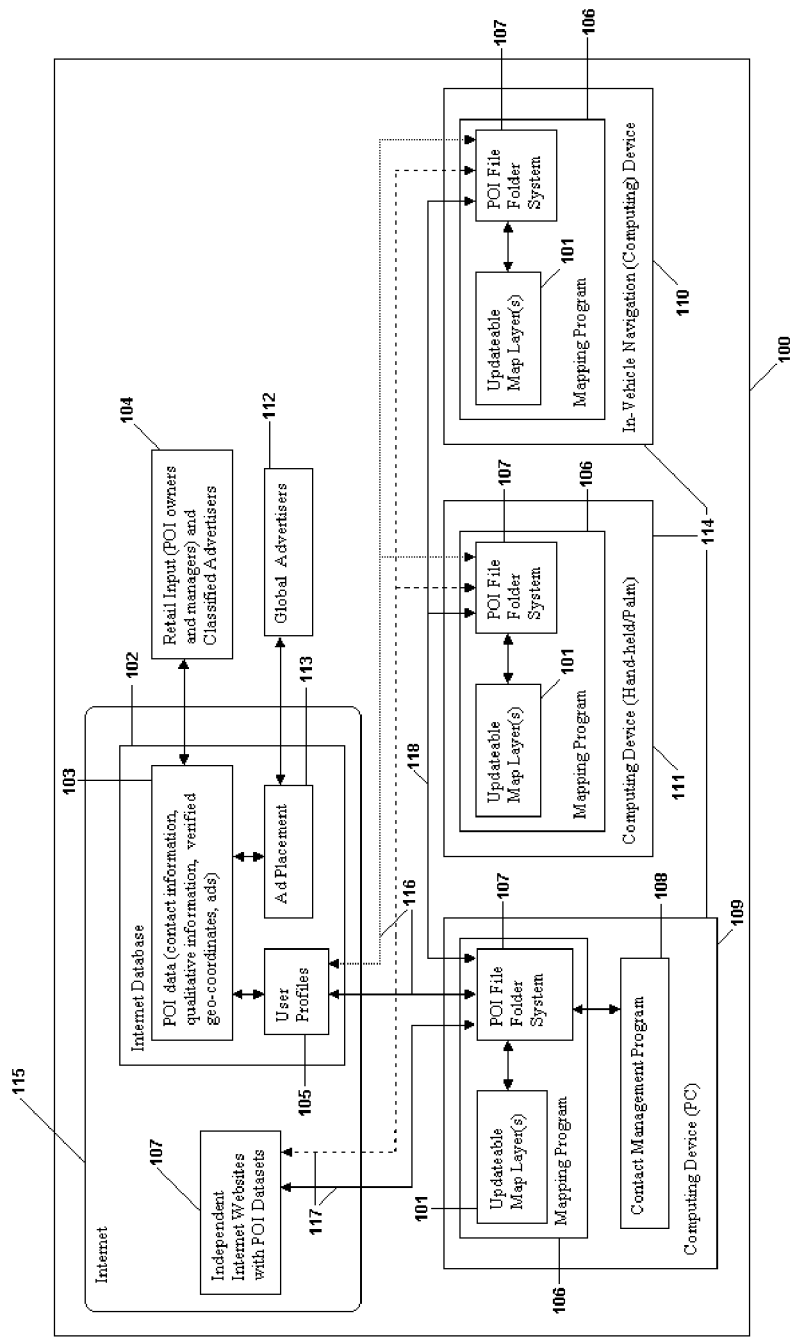
FIG. 1 is an overview of a travel or business mapping system with a user-updateable map layer for collecting, storing, manipulating and displaying points of interest, or POI's.

Information mapping approaches are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

One embodiment relates to improved methods, systems and applications for updating, enhancing, organizing, and utilizing geographic maps, more commonly referred to as travel maps or business maps, for locating points of interest and places of businesses, or POI's. In one embodiment, the present disclosure provides improved use of travel and business mapping programs as a means of quickly delivering enhanced POI information, information which goes beyond the typically provided name, address, phone number data.

In one embodiment, a better, more effective means of locating POI's is provided, and the aforementioned enhanced information, eliminating time-consuming and sometimes fruitless searches. Various embodiments also provide an improved more effective method for collecting geographical coordinate data on POI's; a better means of updating map programs with current and time-dependent POI information; a map program where a subset of the resident, personalized POI's may be selected for downloading into an in-vehicle navigation system or more travel-friendly, hand-held device; an improved method for locating markers on an Internet-based search engine map; and an improved contact management system which minimizes address geocoding.

One embodiment provides an improved travel mapping or business mapping program where supplemental, qualitative POI information is effectively integrated into a map program, providing the ability to assess the "what" and the "where" simultaneously, on multiple POI's, without having to perform another search or go to another source of information.

Another embodiment provides that the supplemental, qualitative information fields associated with each type of place of business or point of interest (POI) on a mapping program, can be unique to each type of POI, and need not be limited to containing standard fields of data across all data sets.

Yet another embodiment shows how a mapping program is an effective base or medium for an information delivery system, especially for geographically locatable objects, and how it is especially useful for delivering types of information found in travel guides, or in delivering advertising information, or in providing links to booking on-line internet reservations.

Still another embodiment provides an improved travel mapping or business mapping program, where map layers containing information and needing more frequent updating, including time-dependent or seasonal information, are updated independently of other more stable and less frequently updated map layers.

In another embodiment, a mapping program has improved methods of organizing POI's using a personalized file folder system, where sets of POI's can be moved into different folders, where sets of POI's can be individually selected and synchronized to a centralized database of POI's, and where the same type of folder system is additionally used to select POI's for downloading into an in-vehicle navigation system or a hand-held palm type device.

Another embodiment provides an improved method of delivering POI's for mapping onto a travel or business map program, or onto an Internet-based map, without requiring their addresses to be geo-coded every time the POI is mapped.

Another embodiment provides an improved method of displaying POI's on a mapping program, in which the level of information displayed on the POI's is controlled or operated upon en masse, using an enriched set of information display control commands.

Yet another embodiment provides methods of marking individual, preferred POI's as favorites for independent treatment.

Still another embodiment provides an improved method of collecting information on POI's, which utilizes participation of the business owners or designated employees of the POI's to verify, correct and provide information on the POI's, including accurate geo-coordinate location information, and which utilizes their participation in the creating of map objects such as buildings to aid in showing the location of a POI associated with the objects.

A further embodiment provides an improved contact management system, which provides a more effective means of matching contact addresses to a map, and which eliminates redundant geocoding.

In other aspects, the invention encompasses a computer apparatus and a computer-readable medium configured to carry out the foregoing steps.

2. Mapping System Example

FIG. 1 is an overview of a travel or business mapping system 100 with a user-updateable map layer 101 for collecting, storing, manipulating and displaying points of interest, or POI's. Hereafter, the term POI (Point Of Interest) will be used broadly to include points of interest, places of business, home locations, landmarks, and any other places which might be visited, and which could appear as a geographically referenced place on a map. An Internet accessible, centralized POI Database (website) 102 is used to collect and verify POI data 103 from businesses, classified advertisers, or other geographically referenced points of interest. The POI business contact (owner or manager) 104 verifies and corrects, if necessary, the physical location of where the POI is to be shown on the map, enters and/or updates the contact information and qualitative information for the POI, and enters or updates advertising information fields 103.

With reference to FIG. 1, the Internet accessible centralized POI Database website 102 is also used to selectively distribute (as indicated by path 116) the collected POI information 103 to owners of map programs 106 having user-updateable map layers 101, based on the personal preferences of the user. Users select (or sign-up for) the POI data sets that they are interested in downloading into the POI folder 107 on their map. This includes identifying or defining a geographical area for each POI data set of interest. This establishes a user profile 105. On return visits, their user profile 105 is used to provide POI data updates for the data sets previously selected.

Users can choose from downloading more complete sets of data, all restaurants for example, to downloading subsets of the data, for example only fast food chains, or only one or two specific fast food chains. As each data set is selected, a geographic area of interest is also selected, i.e., selected by country, state, zip code, city, etc, or by a radius around a point location, or by a custom defined area (polygon).

As shown in FIG. 1, POI data sets may also be available or downloaded 117 from independent websites 107 conforming to POI data set formatting and downloading specifications.

The mapping program 106 can also interface with a contact management application program 108 installed on the computing device 109 to allow contacts from these contact management programs 108 to be mapped and viewed using the same type of graphical user interface (GUI) as used to map and view the POI data sets.

In another embodiment, mapping program 106 may be implemented as a server-based application that is hosted in association with internet database 102. In this embodiment, computing devices 109, 110, 111 use a conventional Web browser to access the mapping program 106, view maps, and perform map manipulation functions. Users may register at internet database 102 and receive accounts. A separate copy of updateable map layers 101 and POI file folder system 107, or data representing them, are hosted at internet database 102 for use by each account. All graphical user interface functions and map data processing functions that are described in the following sections may be implemented in such an embodiment.

In-vehicle navigation systems 110 and more portable, travel-friendly hand-held devices 111 with mapping application programs 106 with user-updateable map layers 101, can be updated with POI data sets directly 116, 117 from the Internet websites 102, 107 in a similar fashion as the PC-based computing device 109, or updated from the PC-based computing device 118. The latter has the advantage of including contacts from the contact management system 108.

The "updatable" attribute of the preferred embodiment mapping system 100 offers an opportunity to include an advertising component, similar to that found in periodicals. In the present approach, the advertising is in a mapping application program, rather than in a magazine or other publication. A number of advertising approaches exist. One approach is to include advertising blurbs, in the form of taglines, POI descriptions, or advertised specials, within the information data set for individual POI's 103, which then appear in the information balloons 301. A second approach is to download and update advertising within the map program on a broader scale, to include pop-up or selectable ads, which are not specific to any one POI, but may be associated with a POI data set. The Global Advertisers link 112 to the Internet Database website 102 to place ads 113, therefore, the mapping system 100 also provides for companies desiring to advertise at this higher or broader level within the mapping program 106.

Each layer 200 is a collection of features that share some common characteristic, while all the layers share a common coordinate system 201. The various physical aspects of the map—land boundaries, lakes 203, rivers 204, borders for country, state, county, city, and zip code, railroads, roads 205, POI's 206, and so forth—are assigned to layers 200. When the various layers are overlaid, they form a map 202 as illustrated in FIGS. 2A and B.

The number of thematic layers 200 can be further separated, and divided down to any level of detail. For example, roads can include separate layers for Interstate highways, state highways, county highways, major roads, streets, walkways, hiking trails, and highway exits. On travel or business mapping programs, POI's can include separate layers for landmarks, airports, train stations, parks, campgrounds, hospitals, ATMs, bus stations, hotels, golf courses, wineries, schools, theaters, gas stations, parking lots, restaurants, etc. Any of these layers could be further divided down or categorized by price, ethnicity, ratings, or by classifications used in the yellow pages.

Figure 3A:
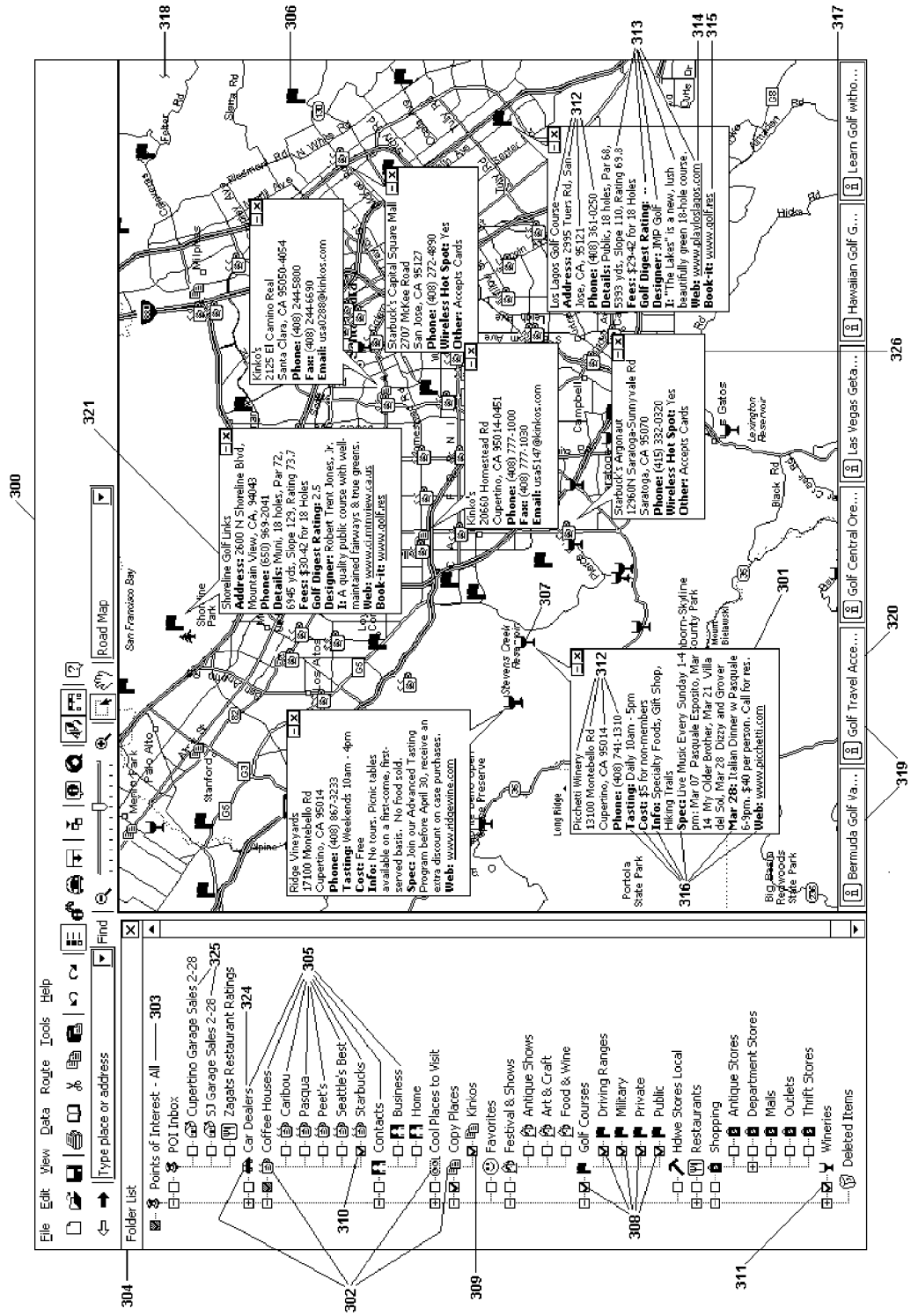
FIG. 3A is a sample map diagram showing varieties of POI's, some with their information windows fully open, displaying examples of enhanced information. It also shows use of a file folder system to store and display POI's.

FIG. 3A shows an example of a mapping program 300 which utilizes a method according to the present invention. Points of interest and places of business (POI) icons 302 are assigned to geographically referenced data sets 305, and appear under the Points of Interest Folder 303, in the left hand Folder List column 304. The data sets to be displayed on the map are selected from the Folder List 304, and can appear as icons only 306, or as an icon 307 with an associated information box or balloon 301. The data sets which have been selected for display on the map of FIG. 3A include Private, Military and Public Golf Courses and Driving Ranges (308), Kinko's (Copy Places) 309, Starbuck's (Coffee Houses) 310, and Wineries 311. The displaying of POI data and the amount of information displayed for each POI is controllable from both the folder list 304 and by direct selection of a POI icon 306, 307 on the map. The information display level for an entire POI data set is controlled from the folder list 304. The selected sets then appear on the map as selectable icons 306, 307, where the information level for each can be changed individually.

FIG. 3A shows a number of fully open information boxes or balloons 301, 321, 326, depicting the variety of qualitative information 313 that might be provided with each POI. For example in FIG. 3A, the two Golf Course information boxes include not only the basic telephone book information 312, i.e., name of the course, address and phone number, but useful supplemental, qualitative information 313 including the Type of course (Private, Public, Military, Resort, Municipal, etc), the number of holes, the course statistics (Par, Rating, Slope, Yardage), cost (range of greens fees), the Golf Digest Rating, the course designer, a description of the course as provided by the golf course, a Website address, and a website link to book a reservation. These information balloons 301, 321, 326 could also show additional useful information such as user ratings, an email address, other course amenities (driving range, practice green, etc.). If the computing device 114 is connected to the Internet 115, clicking on one of the website addresses 314 would connect the user to the courses listed web page, and clicking on the Book-it link 315 would connect the user to a golf tee time reservation website. FIG. 3A includes examples of other POI's. As a second example, supplemental information 316 on the Wineries includes; whether wine tasting is available and its cost, the hours of operation, an information blurb on the winery, information on upcoming events, and a website link.

Figure 3B:
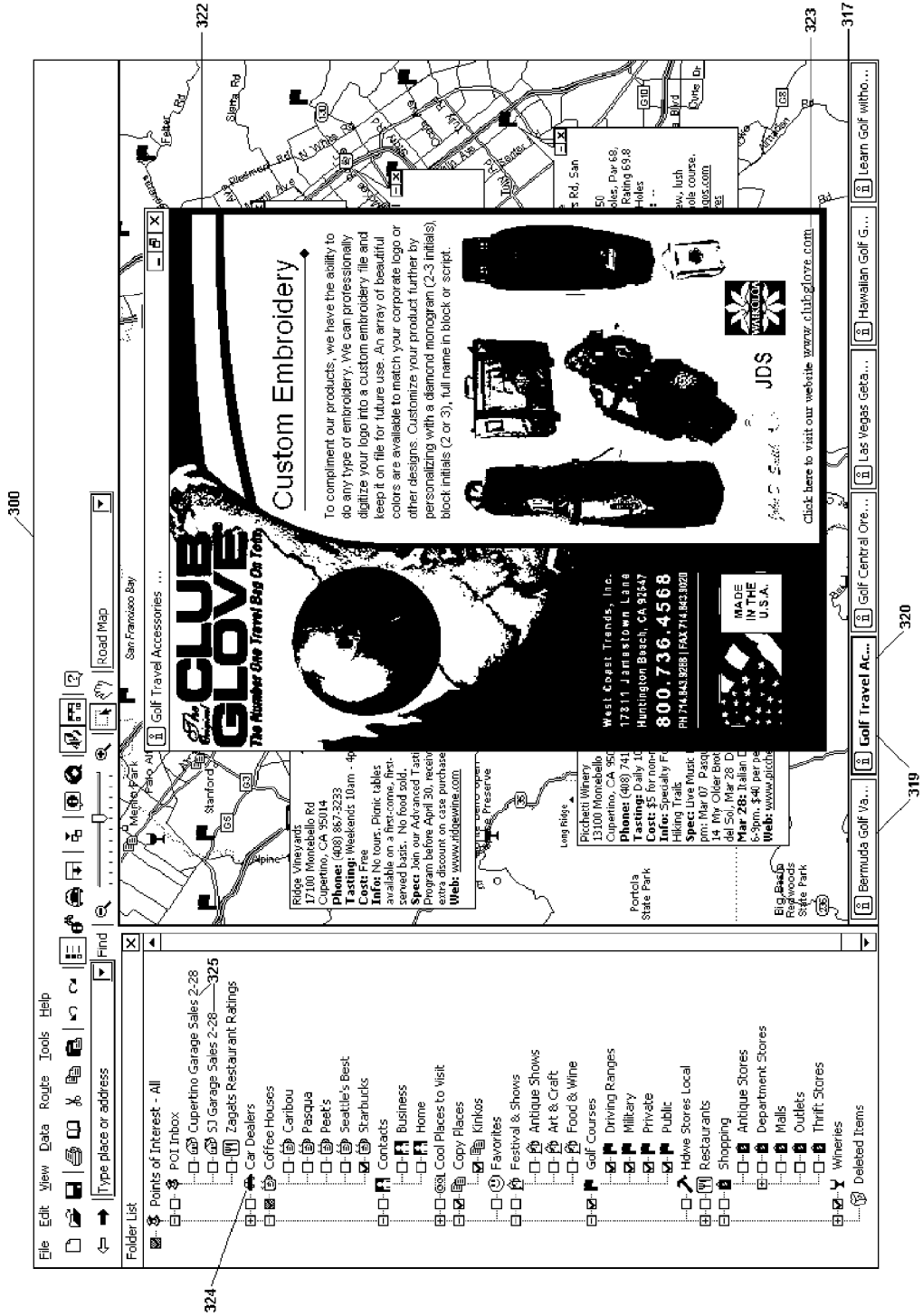
FIG. 3B shows how advertising can play a role in a mapping program.

In FIG. 3A, an Advertising Bar 317 is shown just below the map section 318. The advertising selections 319 appearing in this bar are displayed in association with the last active (selected) POI, or POI set. In this example, golf oriented advertising selections 319 appear coincidentally with the opening of one of the golf course information boxes 321. Selecting the advertising button labeled "Golf Travel Acc . . . " 320, retrieves and displays the downloaded global advertisement 322. FIG. 3B shows an example of this. The advertisement 322 is not limited to one page, and could include a number of hyperlinked pages, or larger, scrollable pages. If the computing device 114 is connected to the Internet 115, clicking on any website links from within the advertisement 323 would hyperlink the user to the directed website. An example of one such link 323 is shown in the lower right-hand corner of the advertisement 322.

Selections displayed on the advertising buttons can change, for example, as POI's associated with a different POI set are active (selected last). Not all the POI sets will necessarily have associated advertising selections, but for example, if a POI or set of POI's from the Car Dealers folder 324 were to be selected, advertising placed by vehicle manufacturers, or a company in the automotive industry, could be selected from a new set of advertising buttons 319.

Figure 4:
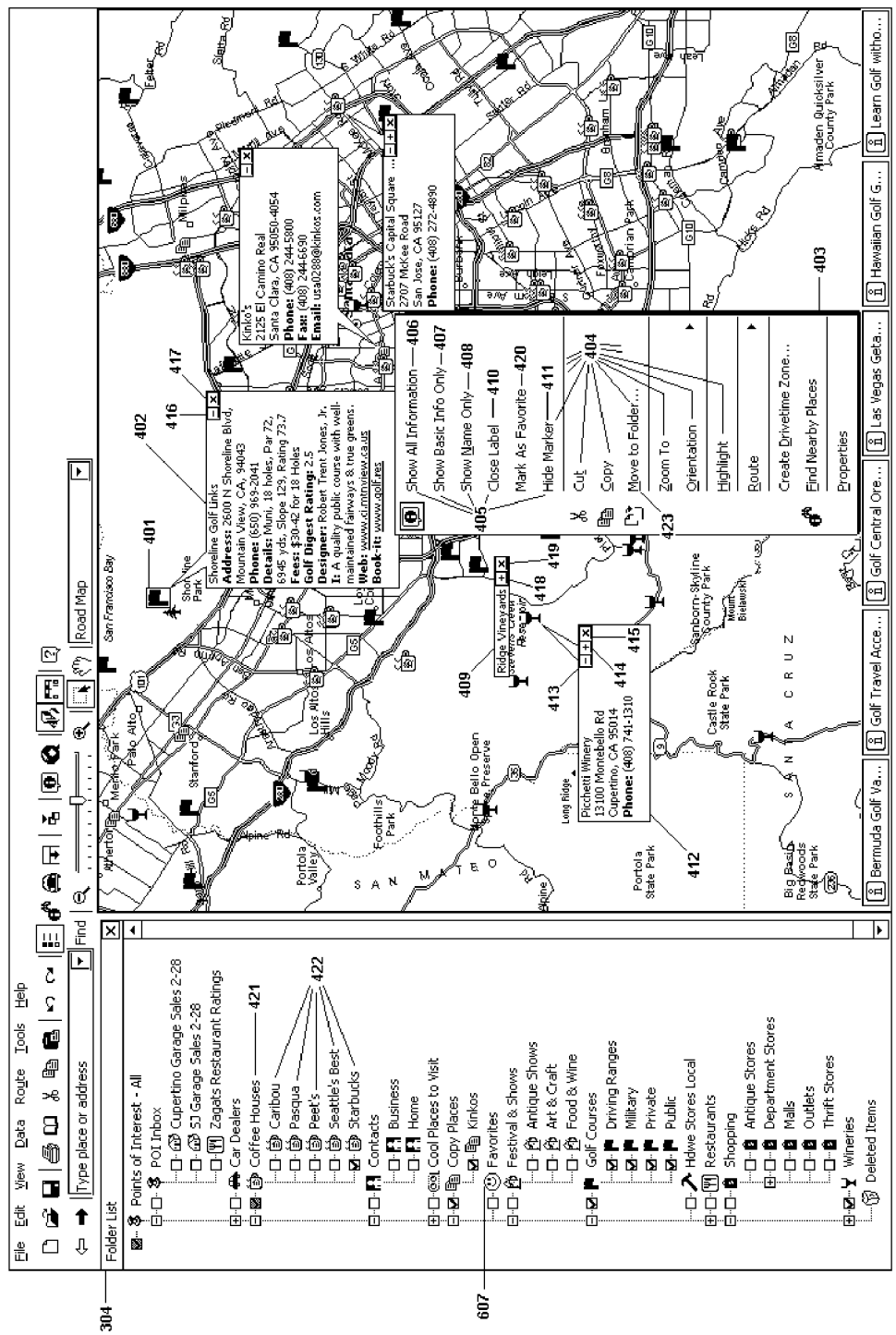
FIG. 4 shows the options for selecting the level of display and the amount of information displayed, enacted on one individual POI.

FIG. 4 shows how the amount of information displayed for any individual POI 401 can be altered, in one embodiment. In this example, right clicking on the Shoreline Golf Links information box or balloon 402, opens a dialog box 403 with a set of commands or functions 404 which can be performed on the POI. This includes commands to set the information display level 405. The highest (most information) level is set using the Show All Information command 406 where all the available data fields for the POI are displayed in the information box 402, as shown in the Shoreline Golf Links information balloon. The next lower level of information display is selected with the Show Basic Info Only command 407. This sets the POI to display basic, telephone book contact type information 312, i.e., name, address and phone number, as shown in the Picchetti Winery information box 301. The lowest information display level shows the name of the POI. This is selected using the Show Name Only command 408. An example of this is shown in the Ridge Vineyards information box (label) 409. The Close Label command 410 closes the information box completely, where only the icon symbol is displayed. The Hide Marker command 411 removes the icon (and all information) from the map, without deleting it from the data set.

Command buttons to perform these same functions, that is to increase or decrease the information display level, or to close the information box, also appear in the upper right hand corner of each information display box as [−], [+], and [x] boxes. The [x] button 415 is a standard Microsoft Windows close button, and performs the same function as the Close Label selection 410. The [−] and [+] controls 413, 414 are used to decrease or increase the information display level, respectively. In one embodiment, the buttons serve to ratchet the information display level up or down, rather than minimizing or maximizing it. For example, the Shoreline Golf Links information box 402 is already at its highest level. Therefore, only the decrease [−] button 416 and close [x] button 417 are displayed. In this case, clicking on the decrease [−] button 416 would set the information display level to show Basic Info 407. Similarly, the Picchetti Winery information box 412 can be ratcheted up to Show All Information 406 with the increase [+] button 415, or down to a label only 408 with the decrease [−] button 413. Since the Ridge Vineyards information box 409 is already at its minimum (a label), it can be ratcheted up with the increase [+] button 418, or closed with the [x] button 419.

In this information display ratcheting operation, each information display is assigned a number with the Show Name Only level being the lowest, and the Show All Information level being the highest. When the [−] and [+] controls 413, 414 are selected, the information displayed is ratcheted down or up, respectively, to correspond with the assigned display number. While this embodiment uses three information level displays, with each showing an increasing amount of information, in alternative embodiments any number of information display configurations can be created that associate different groupings of information. Such configurations could include, for example, only the phone number, or just the qualitative information without the address or phone number. Thus, the controls 413, 414 need not increment or decrement levels, and need not cause changes among levels according to a sequential order.

In the preferred embodiment, once these information levels are set for the POI's, they are unaffected by map zoom level. Information box overlapping will occur, however, clicking on any portion of any information box 402 or label 409 will bring it to the front (most visible top layer). As the map is zoomed in or out, the size of the icon and the size of the information box or font size may be moderately reduced, but it remains viewable and discernable.

FIG. 4 also shows a Mark As Favorite command 420. With this command, the user can identify and select specific POI's for special treatment, which will be explained later in the description.

Figure 5:
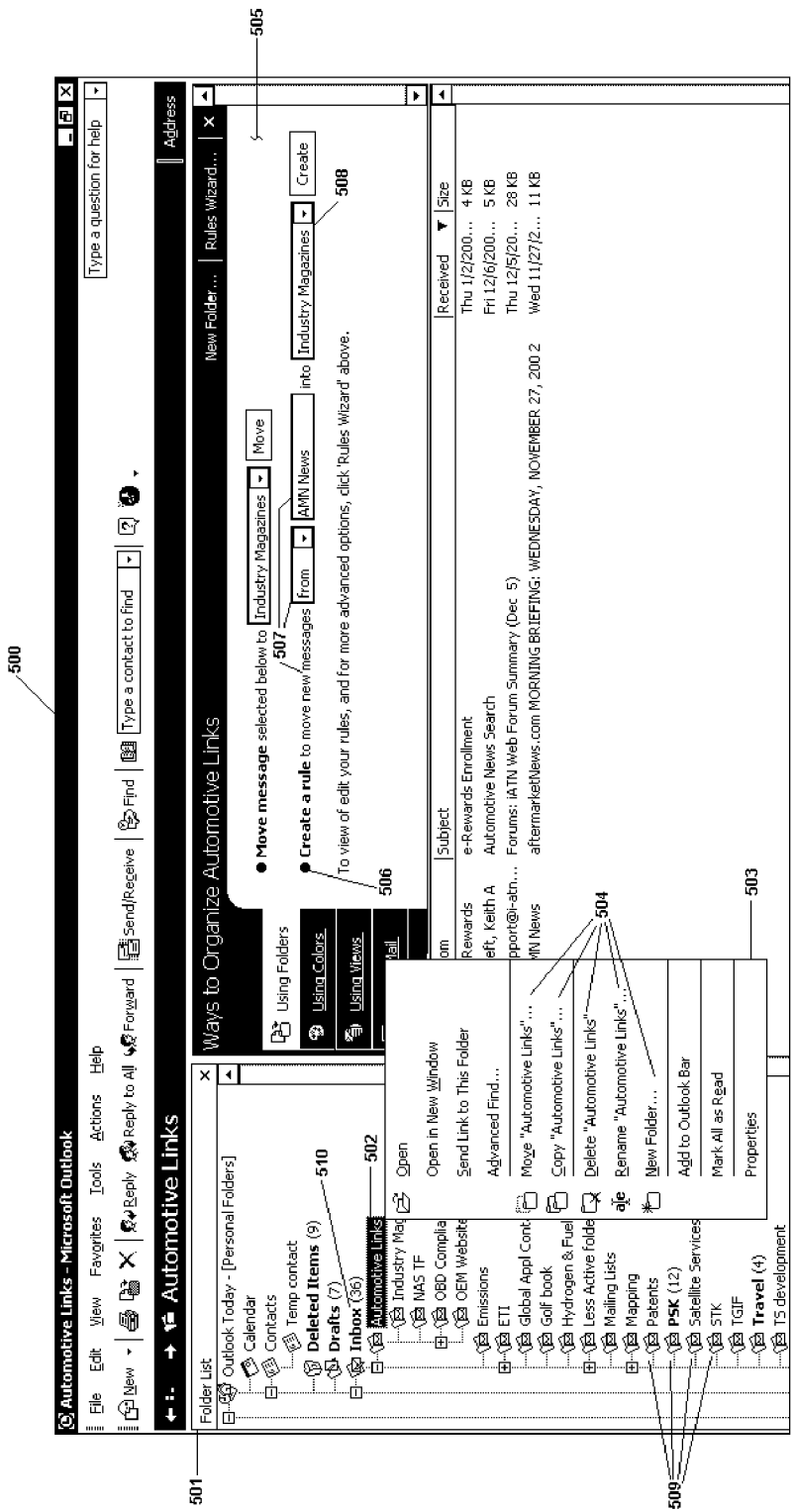
FIG. 5 shows the operations which can be performed on a folder in a folder list column.

In one embodiment, the POI's reside in a file folder system, which allows POI sets to be stored in personalized folders 421 and subfolders 422. The operation and development of a file folder system, which allows the creating, coping, moving, deleting, renaming of folders, is well known by software developers in the industry. For example, referring to FIG. 5, in Microsoft's Outlook 500, incoming emails can be directed automatically into any one of a number of folders 509 created by the user, using rules created in the Inbox Organizer and Rules Wizard 505, or emails can be manually moved from its Inbox 510 into existing or newly created folders 509, or deleted. FIG. 5 shows a portion of a sample Microsoft Outlook Folder List 501. Right clicking on any folder 502 opens a dialog box 503, showing commands 504 for folders to be copied, moved, deleted, renamed or created. In FIG. 5, the dialog box 503 has been activated by right clicking on the Automotive Links folder 502 (highlighted). FIG. 5 also shows Microsoft's Inbox Organizer 505, which allows rules 506 to be created to move incoming email messages 507 into specific folders 508 based on a large choice of criteria.

Figure 6A:
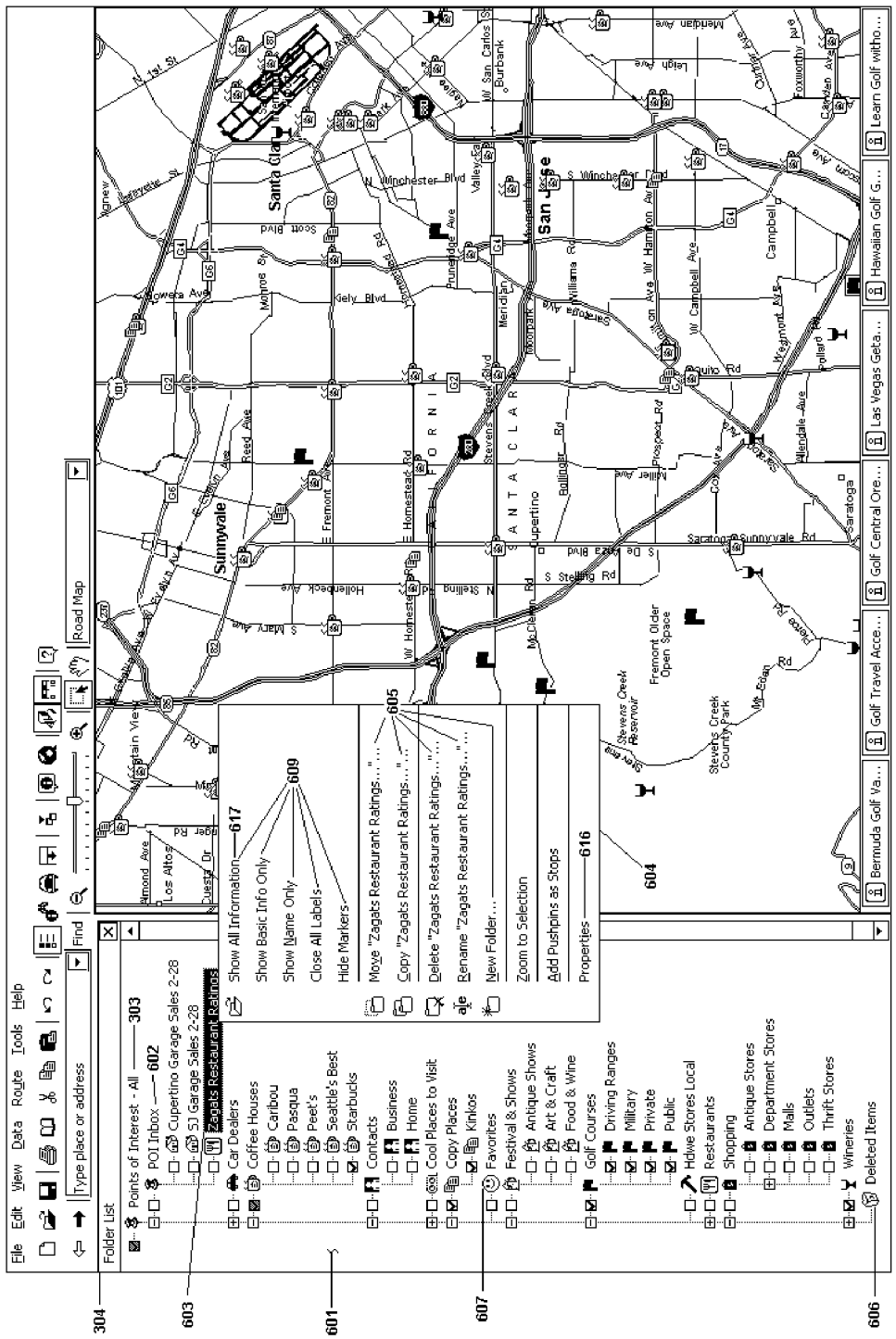
FIG. 6A shows how the folder list operations are applied to a mapping program.

FIG. 6A shows how a file folder scheme 601, shown in the left hand column, can be used to organize POI's. When a user visits the Internet-based centralized POI website 102, described in FIG. 1, to download an update of the POI's in his user profile 105, the downloaded POI sets are automatically directed to specific folders in the Folder list 304. If the user chooses, the downloaded files may also be sent to the POI Inbox folder 602, which is the default download folder, and moved later, either manually or with the Inbox Organizer functions.

As shown in FIG. 1, sets of POI's may be downloaded into the POI Inbox 602 from other, independent websites 107, that follow a specified interface and data format. As an example of this, the Zagat's Restaurant Ratings 603 may have been obtained from a Zagat's website, and not from the centralized POI distribution website 102 in FIG. 1. Right clicking on the Zagat's Restaurant Ratings folder 603 brings up a dialog box 604, with file folder manipulation commands 605 similar to the Outlook commands 504 shown in FIG. 5. Any personally created folder can be moved, deleted, renamed or copied. In one embodiment, "Points of Interest—All" folder 303 and the POI Inbox folder 602, shown at the top of the column, the Deleted Items folder 606, shown at the bottom of the column, and the Favorites folder 607 shown near the center of the column, are permanent folders that cannot be deleted or moved, or renamed.

Figure 6B:
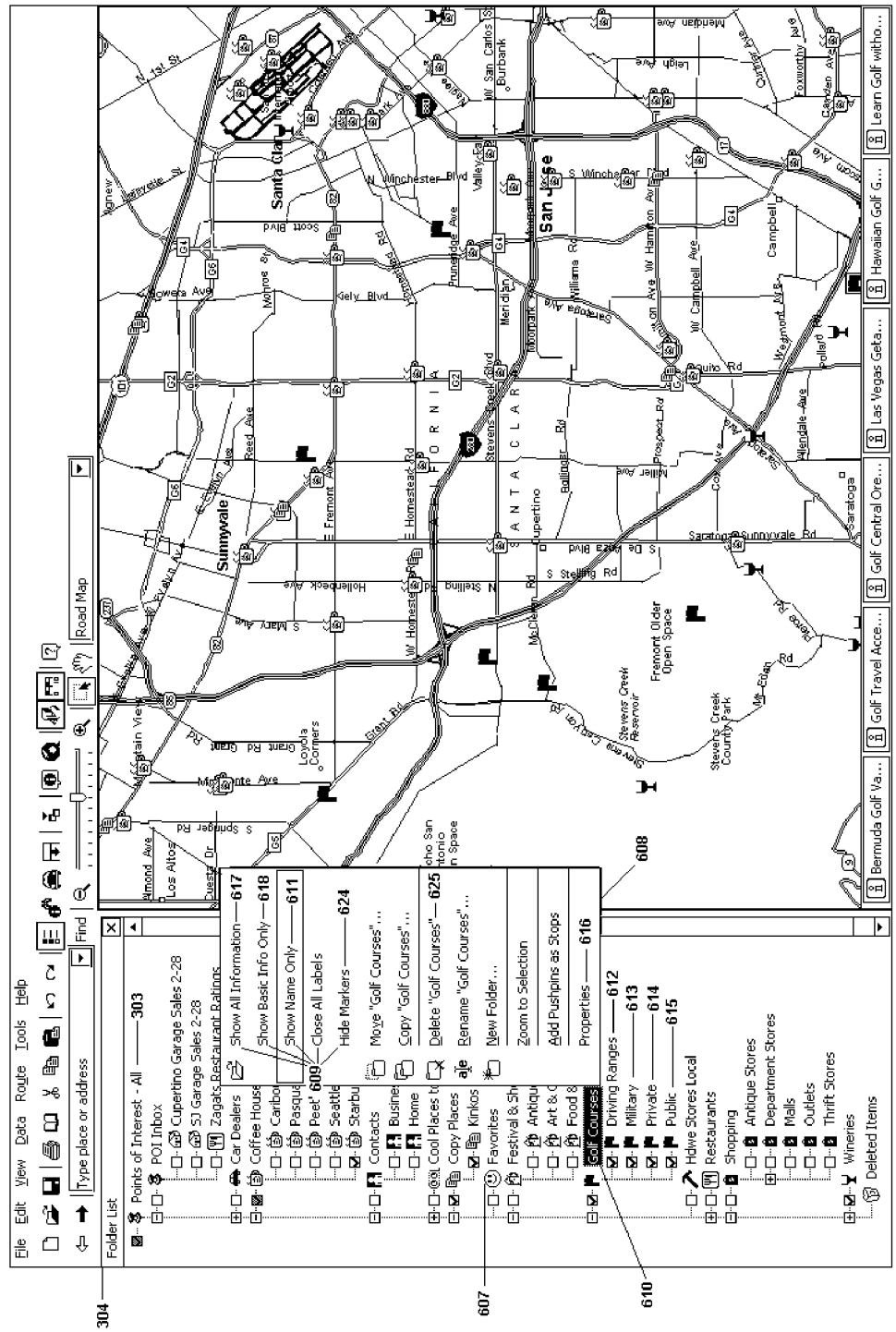
FIGS. 6B, 6 C, 6 D and 6 E show the options and affects for selecting the level of display and the amount of information displayed, enacted en masse for all of one type of POI, and for all POI's. They also show the options for selecting the level of display and the amount of information displayed, enacted on all POI's which were marked as "favorites."

The dialog boxes 604, 608 in FIG. 6A and FIG. 6B also show how the amount of information or information level for an entire set of POI's can be altered en masse, with information level commands 609 similar to those 405 exercised on an individual POI and described in FIG. 4.

Figure 6C:
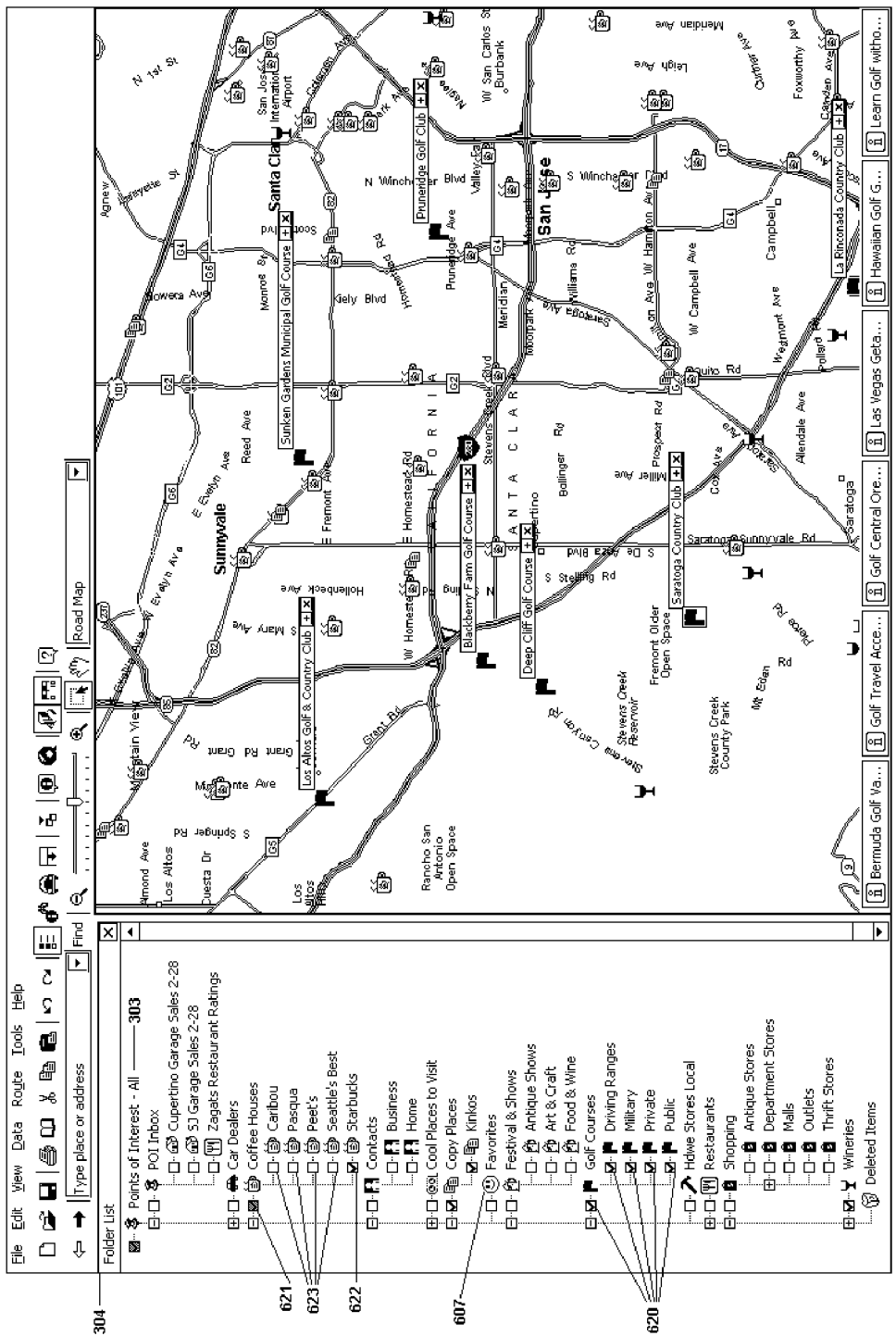

FIG. 6B shows a dialog box open for the Golf Courses folder 610. Selecting the Show Name Only command 611 would result in all Driving Ranges 612 and Military 613, Private 614 and Public courses 615 in the subfolders under the Golf Courses folder 610 to be displayed on the map with their names. The result of performing this command is shown in FIG. 6C. To accomplish this same name opening function on existing mapping programs would require a separate operation to be performed on each individual POI, one at a time.

Figures 7A, 7B:
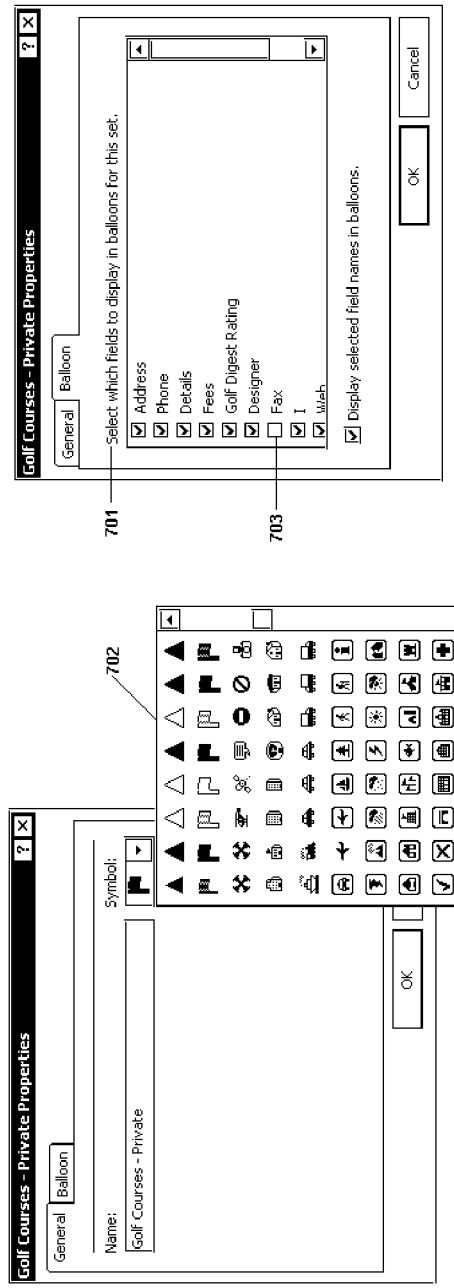
FIGS. 7A and B show examples of the properties selections/settings for the POI's.

The Properties selection 616, shown at the bottom of the dialog box 604, 608, allows customization of a number of data set display elements. Two of these include selecting an icon (map symbol) 702 to represent a particular data set, and selecting the data fields 701 which are to be displayed in the information box for the highest (All Information) level of display. In an embodiment in which the number of qualitative information fields is larger, the amount of information displayed at the highest level in the All Information box 402 can be limited by selecting the qualitative information fields to be displayed. This allows the user to only display information fields which are important, and to limit the size of the of the information box displayed on the map. FIGS. 7A and 7B show examples of these two Properties commands for icon selection and data field selection, respectively. In FIG. 7B, for example, the Fax number 703 is not displayed.

Figure 6D:
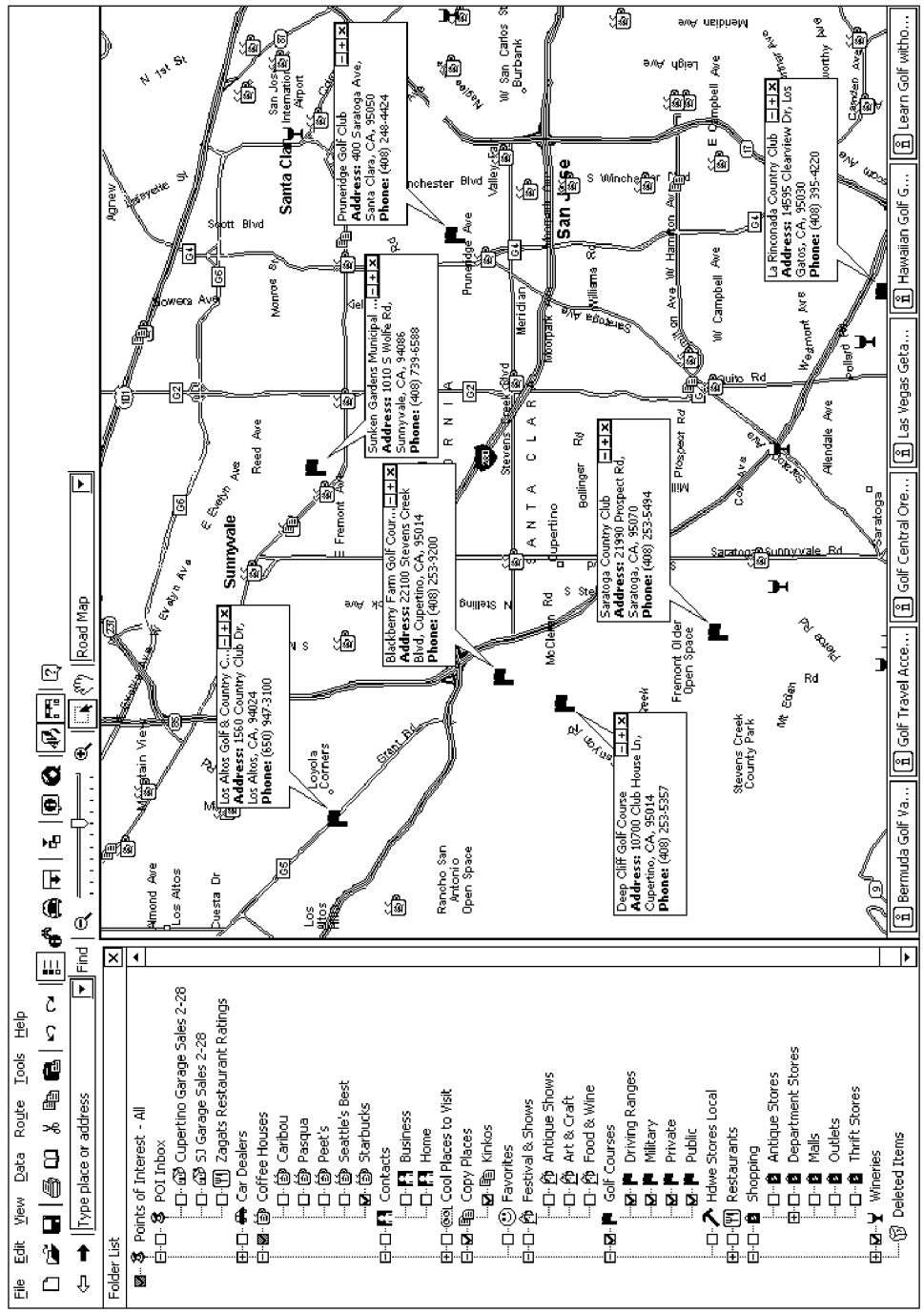
Figure 6E:
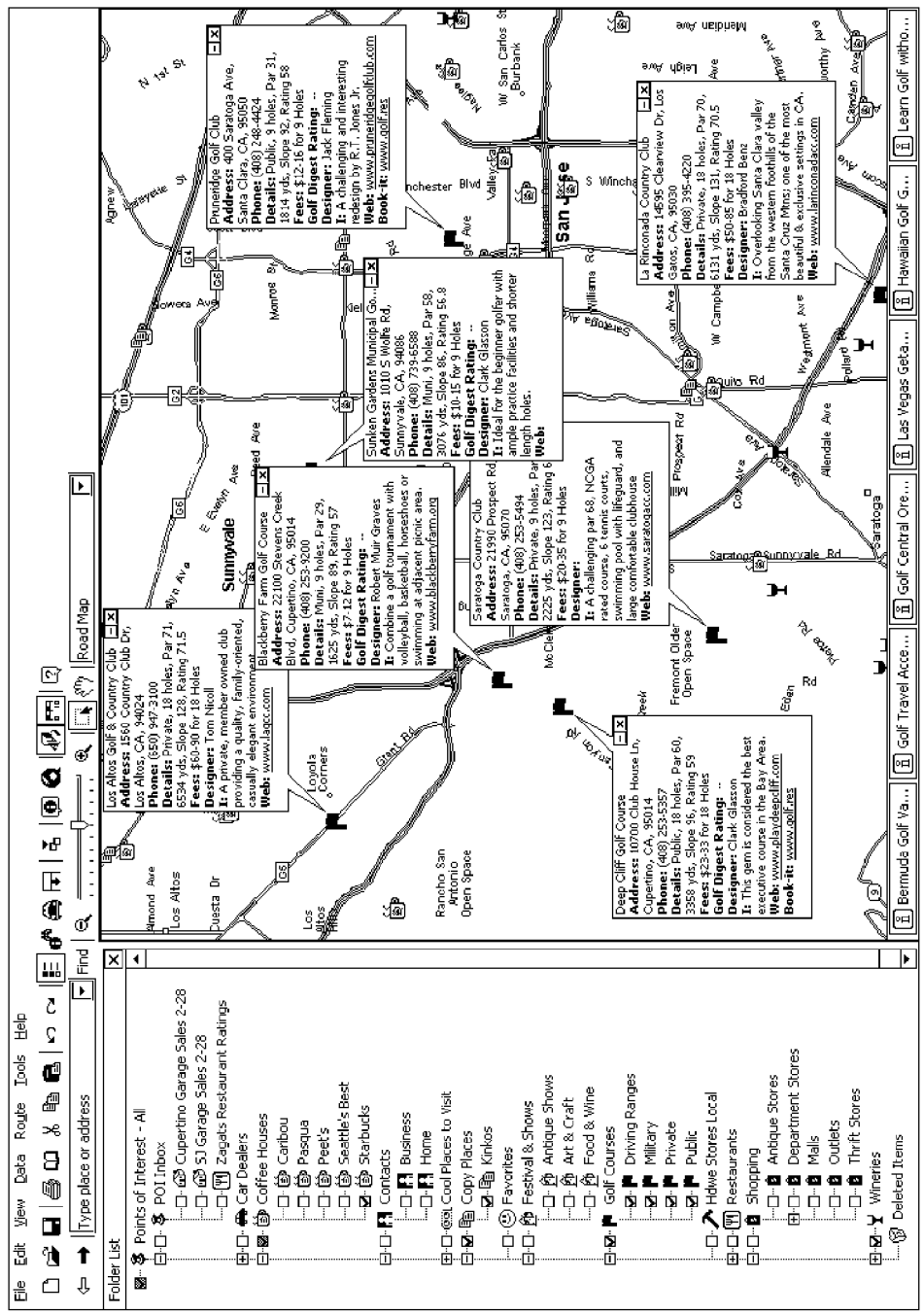

As additional examples of how POI information can be changed en masse, FIG. 6D and FIG. 6E show the resulting displays if the Show Basic Info Only 618 or the Show All Information 617 commands had been selected, respectively, from the dialog box 608 in FIG. 6B.

Referring to FIG. 6C, a check box 619 appears in front of each POI's icon in the Folder list 304, which reflects whether POI's from each folder are displayed on the map. If all of the POI's within a folder are displayed on the map, either as an icon (symbol) only, or accompanied with some level of information, then the box is displayed with a black (bold) check mark. This can be seen in any of the golf related folders 620, for example. If only a portion if the POI's within a folder are being displayed, then the check box is shown with a grayed or ghosted check mark. An example of this appears in front of the Coffee Houses folder 621, as the Starbucks POI's 622 have been selected for display, but not any of the other coffee houses 623; i.e. Caribou, Pasqua, etc. These check boxes 619 are control boxes as well as status boxes. Clicking on any of these, will either add or remove POI's from the display.

In one embodiment, clicking on a blank [ ] check box 619, will cause the POI's in the selected folder to be displayed on the map with the same level information that they were last displayed with. Clicking on a fully selected folder (bold check mark) 620, will remove these POI's from the display, having the same effect as the Hide Markers command 624. Clicking on a partially displayed set of POI's (grayed or ghosted check box) 621 will remove any of the displayed POI's from the map and clear the check box. To turn off, or clear all POI's being displayed on the map, one would only need to click on the top-most Points of Interest—All folder 303. All of the above described information display functions can be used with the "Points of Interest—All" folder 303, allowing for example, all POI's to be displayed at a selected level.

FIGS. 6B and 6C show a folder labeled as Favorites 607 near the center of the Folder List 304. This folder contains links to POI's that were individually marked by the user as being preferred, special or unique, using the Mark As Favorite command 420 described with FIG. 4. Functionally, this approach allows the user to quickly display, or change the information display level of, all the POI's which had previously been marked as being interesting, without having to look for them. The Delete command function 625, shown in the dialog box of FIG. 6B, when applied to the Favorites folder 607, will delete or remove en masse all the POI's marked as favorites from the folder, but not from the application database. In various alternatives, the Favorites folder functionality can be implemented by using either a duplicate record approach, where copies are made of the records, or a linked object approach, where links to the original record are provided.

The methods of providing enhanced, qualitative information, in addition to the telephone book contact information, as taught above, can be applied to any number of places or points of interest; restaurants could have travel guide ratings and price ranges, antique shops could include a description of the type of antiques carried or specialized in, ski resorts could include elevation, the number of runs or lifts, or shopping malls could include a listing of the major anchor stores. Alternatively, individual stores could be displayed on the map within an outline of the shopping mall itself.

In addition, the file folder approach in combination with the copy command could be used to create themed folders containing copies of other folders. For example, a folder labeled "Traveling" might contain copies of the Public Golf Courses, Driving Ranges, Starbucks, and Zagat's Restaurant Ratings. Clicking on the Traveling folder check box, would then place all these travel related POI's on the map with one click.

Figure 8:
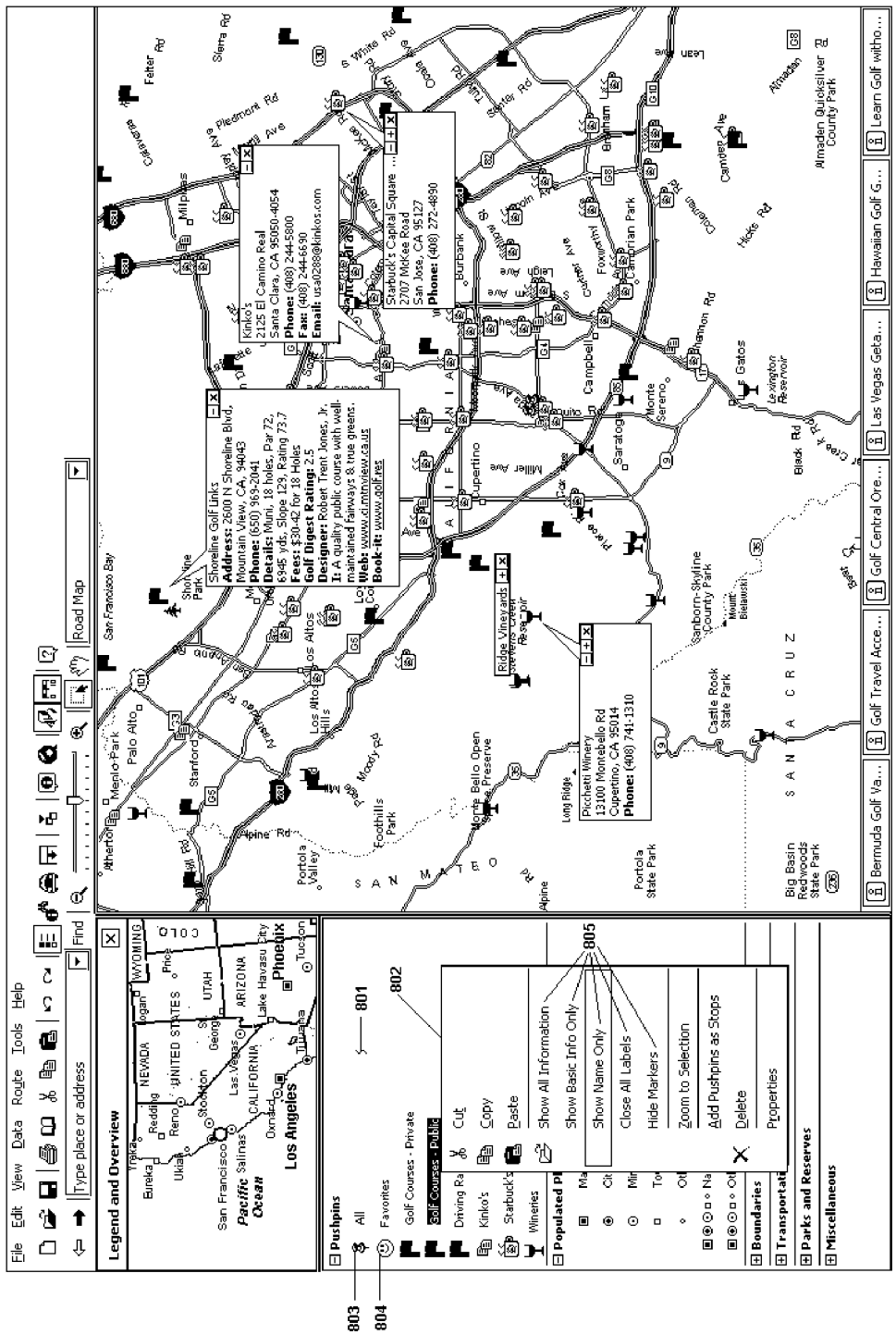
FIG. 8 shows how a non-folder based scheme could be used to implement the same functions described with a folder list.

FIG. 8 shows how the unique functionality described above using a file folder system could be implemented in a non-foldered arrangement 801, as is the case when data sets are imported into Microsoft Streets and Trips or Microsoft MapPoint. This data set arrangement includes unique commands for setting the information display levels of POI's en masse, as shown in the dialog box 802. The addition of non-deleteable "All" 803 and "Favorites" 804 selections within the data set area allows the above described information display level functions 805 to be applied to all the data sets at one time, or to the POI's which are marked as part of the Favorites set 804.

Figure 9A:
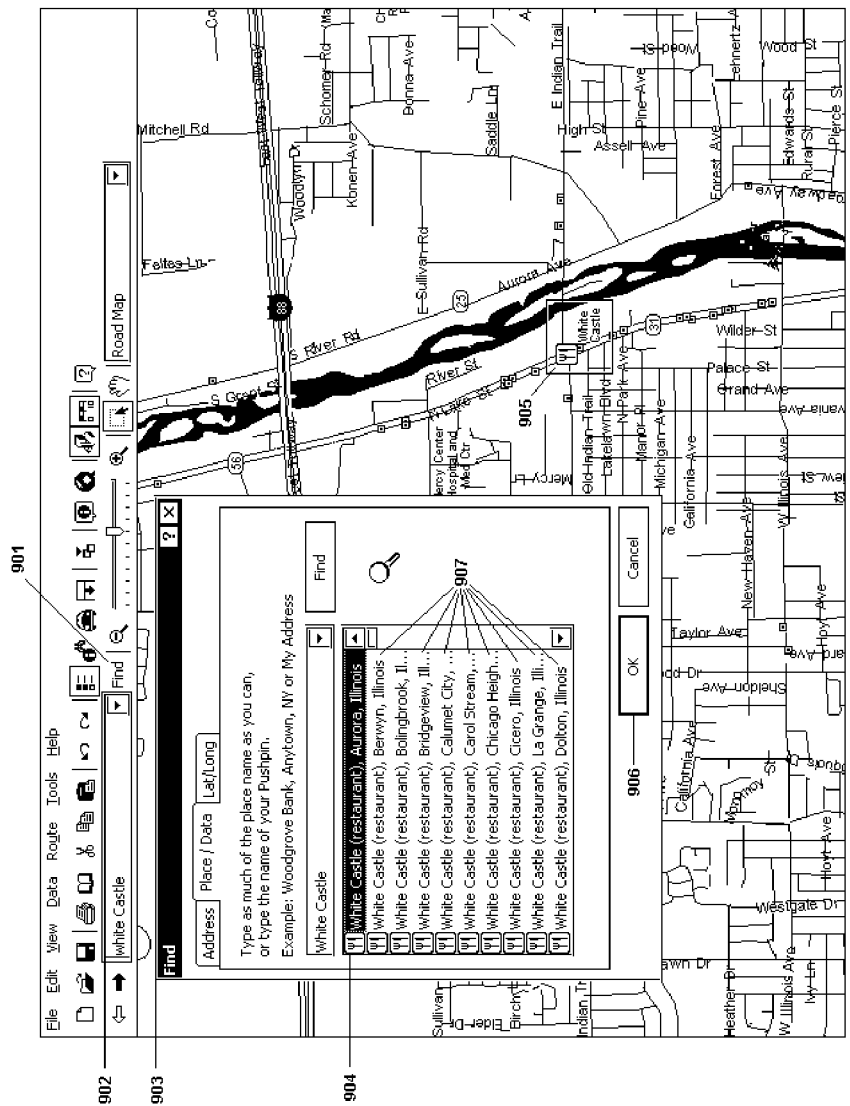
FIGS. 9A and 9B show additional, improved controls for a search results listing.

As described with FIG. 2, maps are comprised of many different of layers. In one alternative, a travel or business map may include a non-updateable POI layer. Further, a travel or business map may allow the importing of a POI data set, where POI's can be selectably mapped. In both these cases, a find command may be used to search for particular POI's of interest. Certain implementations of the find function 901, only allow one POI at a time to be selected for mapping, or to be previewed on the map. An example of this is shown in FIG. 9A, where a search for White Castle restaurants was performed 902. The resulting dialog box 903 only allows one listing to be selected (highlighted) at a time 904, while the map shows a preview of the location 905. When the OK button 906 is pressed, a pushpin (marker) is placed on the map and the dialog box 903 is closed, ending the search. To view more than one location on the map at a time, or to create a set of all the White Castles in a particular area, the above process would have to be repeated multiple times for each listed POI 907.

Figure 9B:
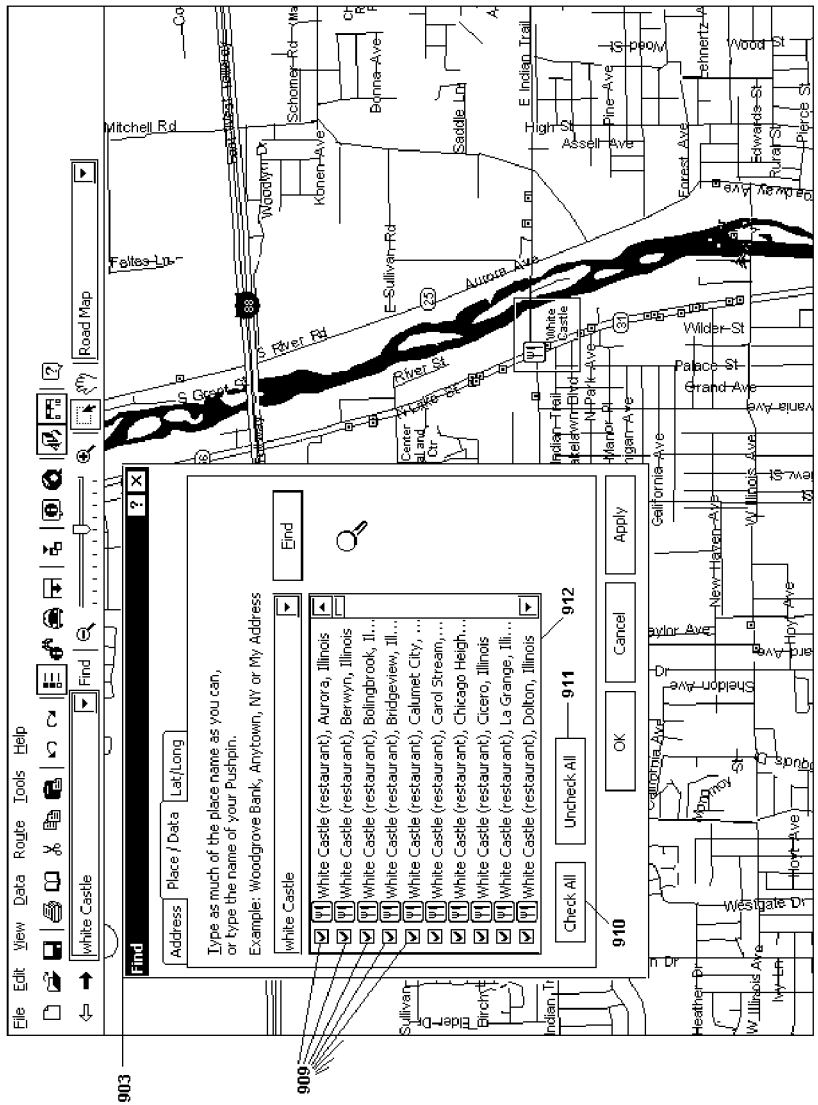

FIG. 9B shows a Find function in which the results of a White Castle search are listed in a dialog box 908, accompanied by a check box 909 in front of each listing. This allows more than on POI at a time to be selected for viewing on the map, without having to perform the same search repeatedly.

Also provided are Check All 910 and Uncheck All 911 buttons to improve efficiencies in selecting listings. Using this technique, all the selected listings will be shown in the map at the same time. In one embodiment, these selected or captured listings can be brought into the personalized file folder scheme as a new data set.

If it is the intent or desire of the user to just select the one, most appropriate POI, as opposed to creating and adding a new data set to the personalized file folder scheme, the Check All button 910 can be used to splash all the listing on the map, whether applicable or not, for location viewing. In many cases, the most appropriate or desirable POI is the closest to a particular location. In this case, it is more effective to view and select from all the potential candidates while they are on the map, rather than from a sorted listing 912. Again if it was the intent to just select one, most appropriate POI, it could then be added to the Favorites folder 607 or moved to a personalized folder using the Move to Folder command 423 shown in the dialog box of FIG. 4, while deleting the rest of the newly mapped data.

In this description, the terms "geographic coordinates," "geo-coordinates," and "geocodes" are used interchangeably to refer broadly to any approach for encoding a geographical location in a data representation that can be manipulated by a computer. One example of geo-coordinates is a pair consisting of a latitude value and a longitude value. However, alternative embodiments may use any appropriate coding system, or any suitable coordinate system that is based on any desired point of origin.

Figure 10:
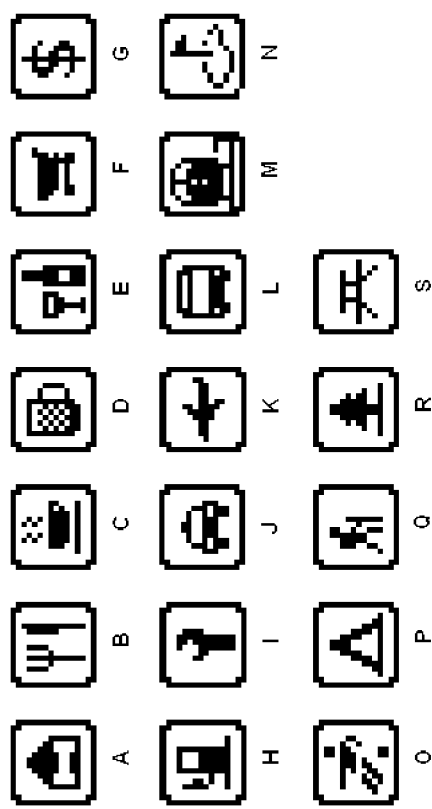
FIGS. 10, 11, and 12 show symbols used to mark POI's, and the use of complementary symbols.

A variety of symbols or icons are used to mark POI's on a map. When these symbols or icons are mapped to a particular location, a geocoded address for example, in past approaches the symbols generally have been center-located over the geo-coordinates. For some pushpin and flag symbols, the end of the pin, or bottom of the flag pole, is located at the geo-coordinate. Often when more than one POI is mapped to the same location or same address, the symbols stack-up or overlay, often only allowing only one symbol to be seen, while hiding the others. This occurs when the symbols share the same shape or outline, or when a larger symbol is at the top of the stack. FIG. 10 shows an example of a set of icons sharing the same outline. For example, it is fairly common for a hotel, restaurant and bar to share the same street address, or for a golf facility to have multiple golf courses, or for many or all the stores and restaurants in a shopping mall to have the same street address.

To address this problem, multi-part or complementary symbols are used in one embodiment. These symbols allow multiple POI's with the same address or geo-location to be both viewed and selected. In the case of golf courses, for example, primary and secondary symbols are used.

Figure 11:
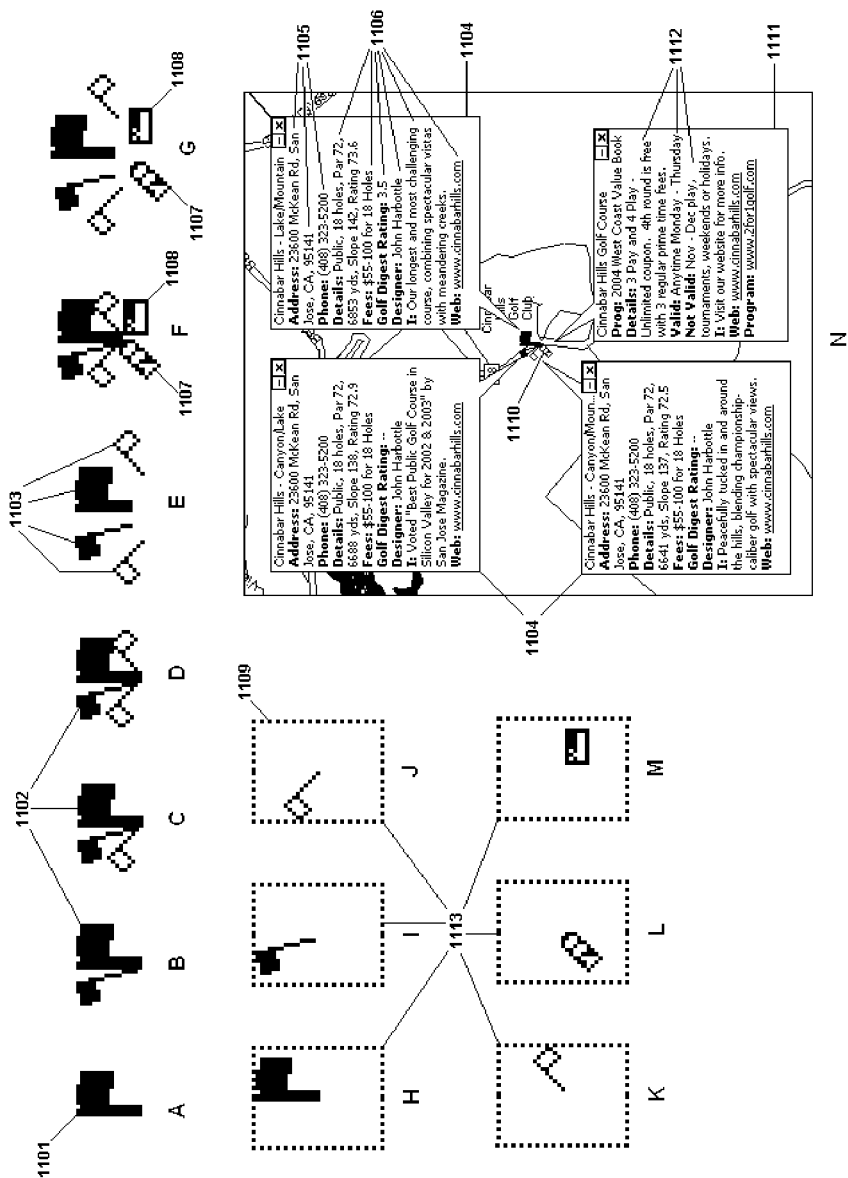

Referring to FIG. 11, the flag 1101, shown in FIG. 11A, is the primary symbol, which appears with any golf facility. If the facility has more than one course, secondary symbols 1103 are used to form the various symbol configurations 1102 shown in FIGS. 11B, 11 C, and 11 D.

FIG. 11E illustrates how these symbol configurations are made up of independently selectable elements 1103. The user can visually determine how many courses are located at the facility, in this example up to four, and independently select any element 1103 to open the qualitative information box or balloon 1104 for each course. In the case of multiple golf courses at the same facility, they more than likely all share the same basic telephone book information 1105, i.e. address and phone number, but have different slopes, ratings, yardages, etc. as indicated by reference numeral 1106.

FIG. 11F shows two additional symbols which were added to complement the group of golf courses at a golf facility. The symbol on the lower left 1107 indicates the course is listed in a particular golf discount book program, which is very similar to the more familiar "Entertainment" book program, except it focuses on golf courses. The symbol in the lower right 1108 indicates the course is participating the Golf Card program, which also offers golf discounts to card members. In the preferred embodiment, all six of these symbols can be mapped to the exact same geo-coordinate, while remaining visible and selectable. FIG. 11N shows a mapped example of a golf facility with three golf courses that also participates in one discount program 1110.

The offset mapping of symbols can be accomplished in a variety of ways. One such method is to offset the drawn symbol to an edge or corner of an oversized bit-mapped image frame 1109. Then as the symbol frames 1109 are center located (registered) to the geo-coordinate, the icons will appear around the center point. FIG. 11H-11M show how the six complementary symbols appearing in FIG. 11F were created within the same frame size, indicated by the dashed lines.

Another example includes the mapping of the "Entertainment" books, which offer discounts for restaurants, sporting events, accommodations, movie tickets, etc. These discount book and discount card program examples show how information which is related or associated with a POI can be mapped and maintained independently of the information appearing within the POI information box 1104, and how additional complementary symbols 1107, 1108 can be used to indicate the existence of something special or unique at the POI site. The application of this approach, however, is not limited to discount programs and could easily apply, for example, to booking reservations for hotel accommodations, golf tee times, tickets to an event, or travel/vacation packages, or to purchasing other items or merchandise, or to indicating participation in AAA or AARP discount programs, or to the locating of a golf instructor with his own information profile.

While these discount programs or "POI associated programs" may not be POI's in themselves, in one embodiment they are mapped to the same location as the primary POI, and they may be downloaded from the same centralized POI database 102 by the user. However, since the information boxes associated with these symbols contain information supplemental to the POI, they need not contain the standard telephone book information 1105 (address and phone number) of the POI. In the example shown in FIG. 11N, clicking on a POI associated program symbol 1110 reveals the details of the program 1111, in this case, it includes the discount offered at the golf course 1112. However, in most of the applications and processes, the "POI associated programs" are operated upon and treated the same as the POI's, and therefore, in cases where no differentiation is made, they should be assumed to be included as part of the POI's.

Figure 12:
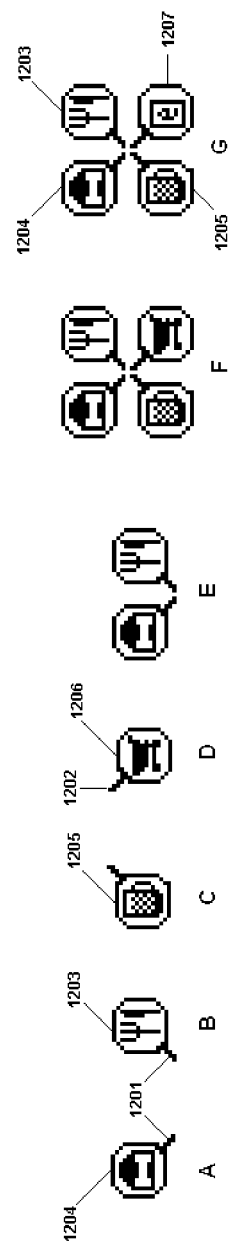

FIG. 12 shows how complementary symbols can be made by adding pointing pins 1201 to the descriptive or framed symbols shown in FIG. 10. As with pushpins, the end of the pin 1202 on these symbols is located to the geo-coordinate, allowing multiple POI's having the same location to be simultaneously viewed on the map, as shown in FIG. 12F. If for example, all restaurant symbols 1203 were assigned a left descending pin (FIG. 12B), all hotel symbols 1204 a right descending pin (FIG. 12A), all bar symbols 1205 a right ascending pin (FIG. 12C), and all shopping location symbols 1206 a left ascending pin (FIG. 12D), the user can visually determine whether a hotel had a bar, a restaurant, or shopping available.

Unlike, the primary/secondary symbol arrangement described in FIG. 11, where secondary symbols are somewhat dependent upon the presence of a primary symbol, any of these complementary symbols shown in FIG. 12 are also independently or individually mappable. This symbol pinning technique can be applied to commonly associated or commonly located POI's, for example, for gas stations and service stations. Configurations having more than four elements can also be developed. FIG. 12G shows an example where information on discounts found in the "Entertainment" book can be mapped as a complementary symbol to the hotels 1204, restaurants 1203 and bars 1205, allowing the user to quickly see where discounts are offered and easily obtain details by clicking on the "Entertainment" book symbol 1207.

Figure 13:
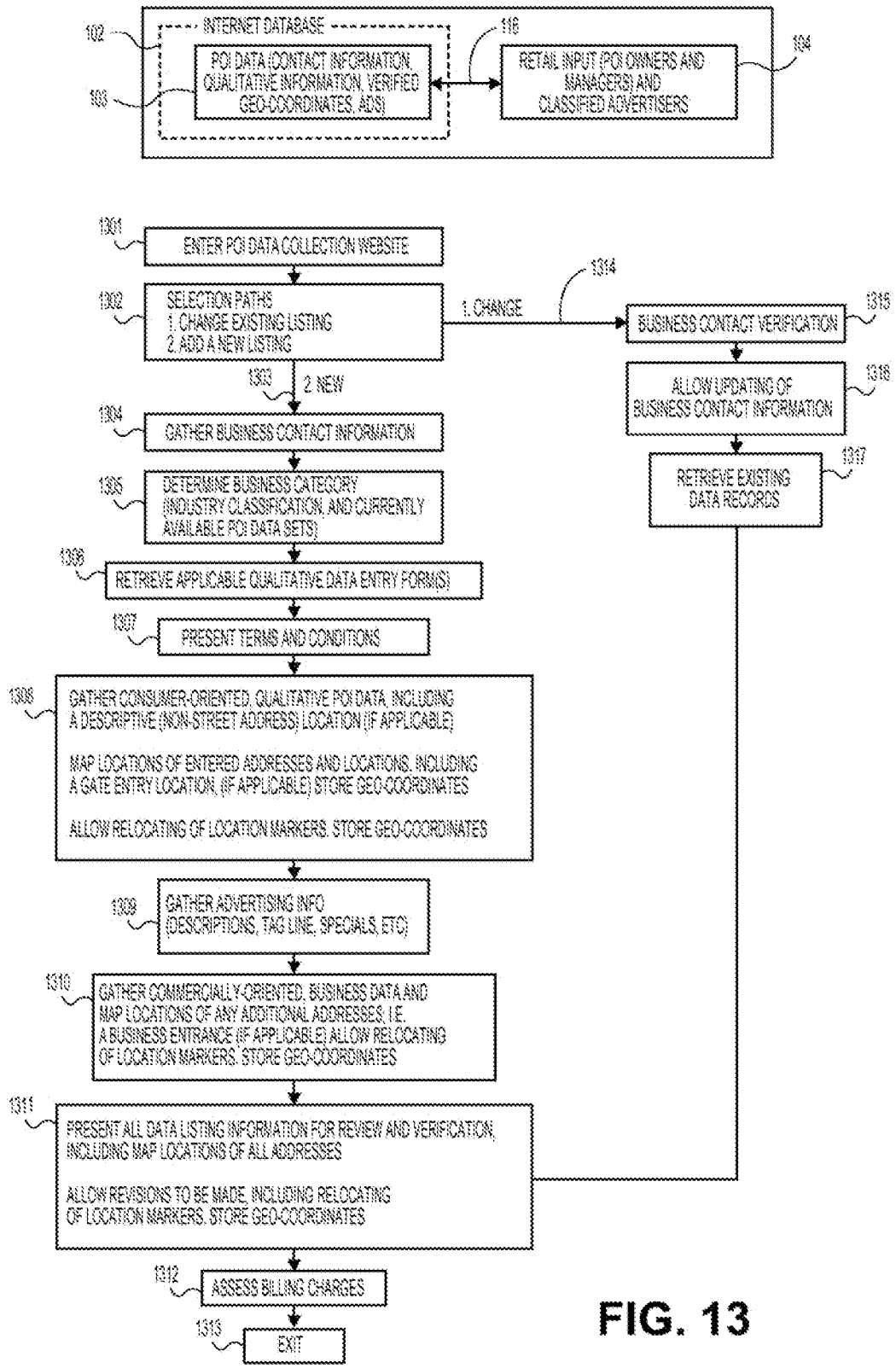
FIG. 13 is a flow diagram of the process to capture POI information from POI managers.

FIG. 13 shows a flowchart of an example process to capture POI information from a party. In this context, the terms "party" and "manager" broadly refer to anyone who is authorized to create or modify POI information or a POI location, or who has the knowledge and trustworthiness appropriate to create or modify POI information or a POI location. For example, a party or manager may be the business contact, owner or manager of a POI 104, an authorized individual associated with the owner or manager, etc. Upon entering the website at step 1301, the party selects whether a new listing is to be created or an existing listing is to be revised at step 1302. Following the Add a New Listing path 1303 on the flowchart, business contact information is gathered at step 1304; the information may include, for example, name, title, phone number(s), email address, mailing address, etc. Then a business category is selected from a listing of industry classifications and currently available POI data sets at step 1305. In cases where the business entity was previously solicited to sign up for the POI listing service, the solicitation ID number previously forwarded to the party is entered to identify the appropriate business category, and/or to retrieve any already entered and available data on the POI.

Based on this business category selection, appropriate data entry forms specific to the business category are retrieved from a database at step 1306. This offers two advantages. First, it allows information specific to the business to be collected. For example, yardage, slopes, ratings, will be gathered for golf course listings, while tasting-related information will be gathered from wineries. Second, this allows heightened use of drop-down list boxes to improve accuracy and consistency of the collected data.

Data entry forms are used to collect consumer-oriented, qualitative information on the POI at step 1308. This is information that will be shared with the public, appearing in the POI information boxes on the map. For any entered street addresses, a map of the entered location is presented for location verification. The party is allowed to move the POI marker to the correct or desired spot on the map, by navigating to the location using commonly available map navigation controls.

In various alternatives, POI markers can be dragged and dropped, or the exact location of the POI can be double-clicked on. Instructions on how to move the marker, and suggestions on where to place it may be provided. In the case of golf courses, for example, it is suggested to the party to place the POI marker at the entrance or driveway of the property, rather than at the center of the property or at some internal location that may not be obvious how to reach.

Once located, the geo-coordinates of the POI location are computed automatically and stored.

In one embodiment, the party is also asked whether passing through a gated entrance is required to gain entry to the POI. This is the case, for example, with some military facilities and gated communities, where the golf courses are located in the middle of a gated complex, and entry through a specific gate is required. If this is the case, the party is presented with a map on which to identify the specific location of the entry gate(s), using a process similar to that used to confirm the location of the POI. Geo-coordinates for the entry gate(s) are then stored with the record.

Figure 14B:
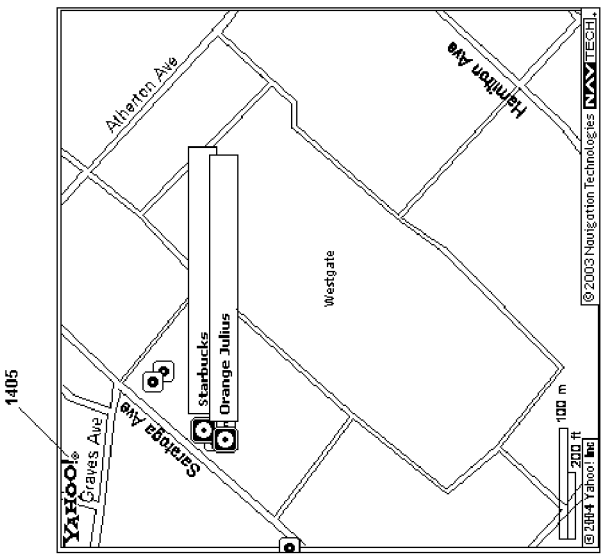
FIGS. 14A and B and FIGS. 15A and B show the process and benefits of using geo-coordinates to locate POI's at airports and shopping malls.
Figure 14A:
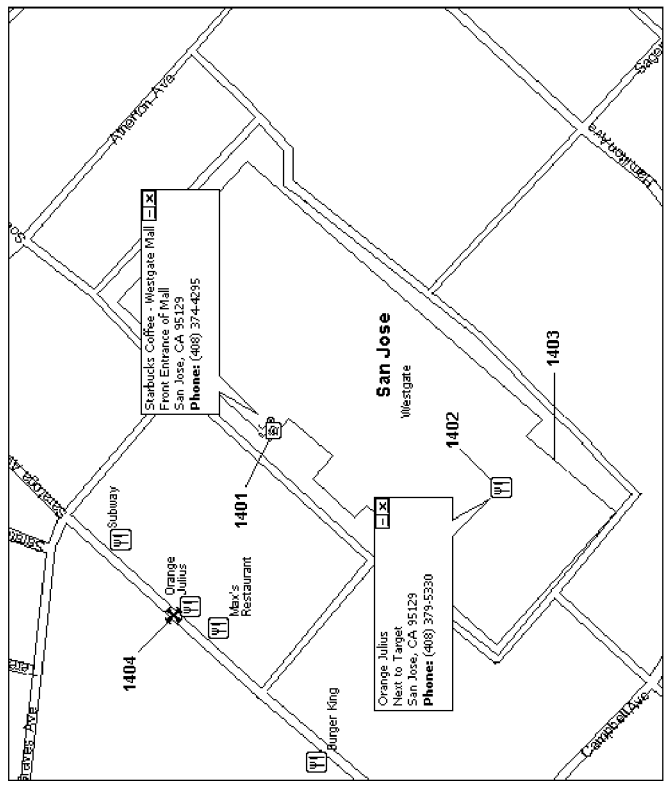

With the storing of a geo-coordinate for each location, the "address" itself does not need to be a complete street addresses; i.e. street number, street, city, state, zip code, but instead can be more of a descriptive address. For example in the case of a Starbuck's location at an airport, it may be "Across from Gate A 5", or "Just inside West entrance" for a Starbuck's location at a shopping mall. Not all POI locations are best described and located by a street address. In the preferred embodiment, the business contact (POI manager), for example, will be able to manually locate the POI marker to a more representative location. FIG. 14A shows examples of two POI's, Starbuck's 1401 and Orange Julius 1402, which have been moved to a more representative location within the outline of a shopping mall 1403. They were both originally mapped near the "X" on Saratoga Ave 1404. FIG. 14B shows where an Internet, map-based search engine 1405 has located these same two POI's.

Figure 15B:
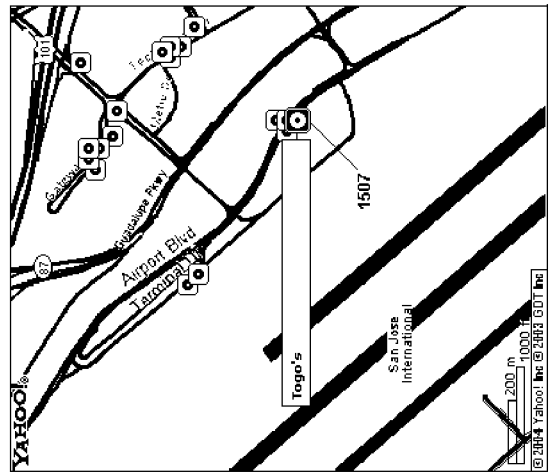
Figure 15A:
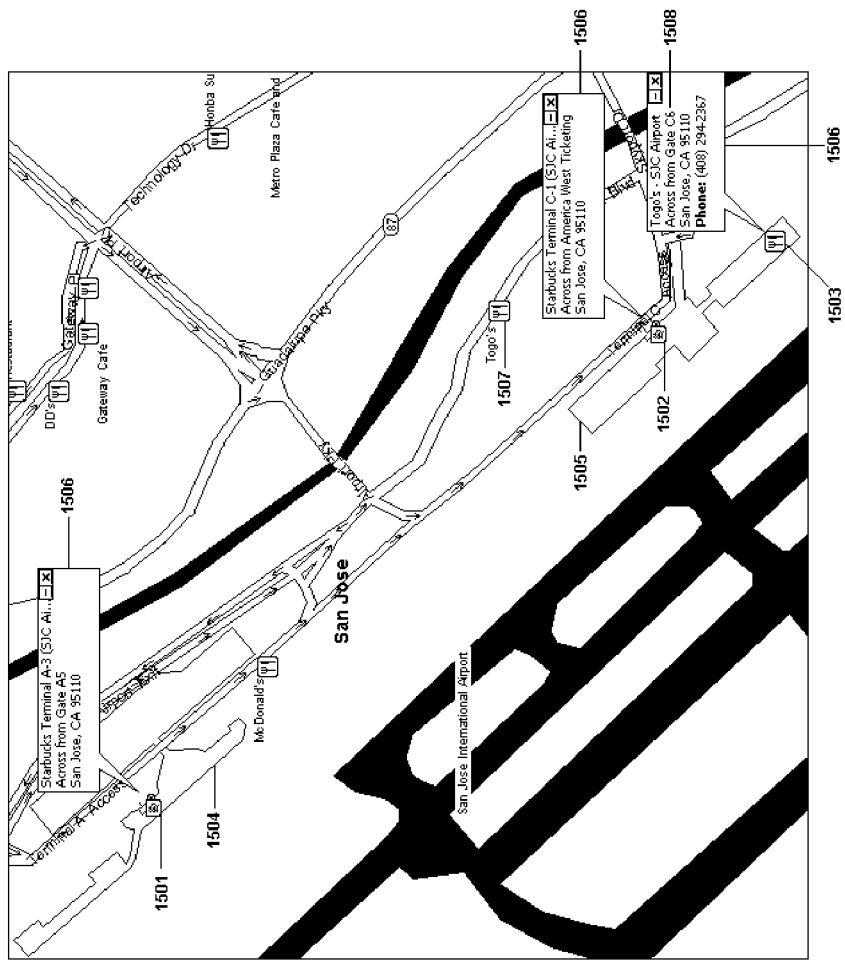
Figure 16:
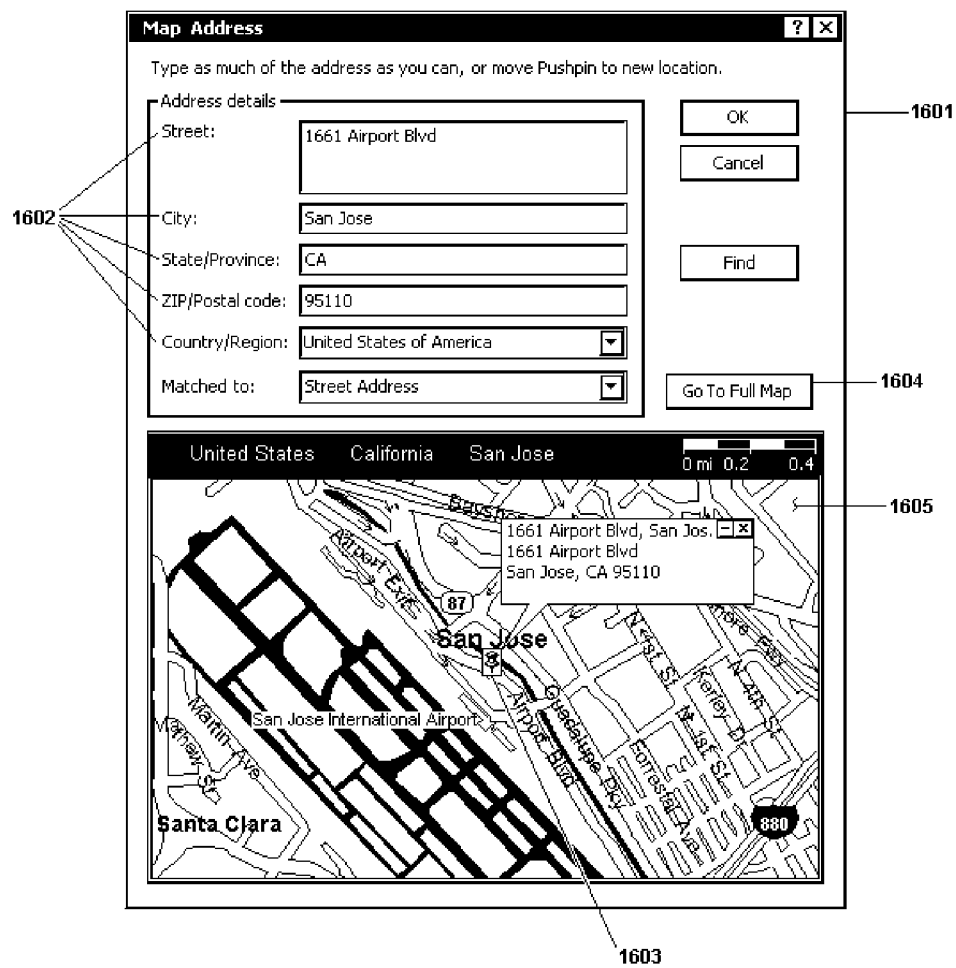
FIG. 16 shows an improved dialog box for relocating a geo-coded address to a more representative location.

FIG. 15A shows another example of POI's which are not best represented by a street address. Two Starbuck's coffee shops 1501, 1502 and a Togo's restaurant 1503 have been manually located within the outline of an airport terminal's buildings 1504, 1505. The information boxes 1506 contain descriptive locations, which are better suited for airport travelers. The street address mapping of these POI's had them stacked-up at 1661 Airport Blvd., as represented by the Togo's markers 1507 in the travel mapping program of FIG. 15A, and the Internet-based map in FIG. 15B. In the preferred embodiment, a Map Address dialog box 1601, as shown in FIG. 16, is used to verify the entered address 1602 and mapped location 1603 of the POI. The party can revise the entered address and/or move the marker to a more representative location. In the case of the Togo's example used in FIG. 15A, a descriptive location address is entered, "Across from Gate C 6" 1508, after moving the marker 1603, 1503 to a location within the airport terminal building boundaries 1505. If additional navigation controls are required to reposition the marker, zooming in or out for example, the party can option to go to the full map program with the Go To Full Map button 1604.

The ability to draw shapes (boxes, circles, polygons, etc.) is a function of some travel or business map programs and on GIS programs. For example, the outline of the shopping mall 1403 in FIG. 14A, and the outlines of the two airport terminals 1504, 1505 in FIG. 15A, could be drawn with drawing tools available in Microsoft Streets and Trips travel program. Any drawn shapes then can be registered to the common geo-coordinate system 201 described with FIG. 2, so they can be imported into and used in other mapping application programs.

In one embodiment, the Full Map Program is accessed by selecting the Go To Full Map button 1604 shown on FIG. 16, which provides the user with a drawing toolbar (not shown) and the ability to draw on the Internet-based map 1605. In cases where the party desires to locate a POI within, or with reference to, a building, a shopping mall or an airport terminal for example, and the building is not shown on the map, the party can elect to draw in details of a structure. The Full Map program provides the party with drawing tools and the ability of overlaying an aerial photograph. The party can choose to draw in a building with or without the aerial photograph. The aerial photograph, however, provides additional reference points and may contain a photograph of the building itself which can be traced over. Once the structure is drawn, the aerial overlay is removed, and the party can proceed to position the POI in an appropriate location with respect to the newly drawn building. The shape files for the buildings, which are drawn by the POI business contacts, are stored and are integrated into the mapping application, either as an updateable map layer download 116, or as part of the main mapping application program software 1803.

Referring again to FIG. 13, advertising oriented information is then collected 1309, for display in the information boxes. The "Info", "Spec", and "Mar 28" fields 316 in the Picchetti Winery box 301, shown in FIG. 3A, are examples of entered advertising information for POI's. In this step of the process 1309, as it applies to the placing of classified ads which are to be downloaded to the map 325, classified advertisers would enter descriptions of items being sold.

Still referring to FIG. 13, data is also gathered on the commercially-oriented business information 1310, for example, names and contact information of the primary personnel (owner, buyer, general manager, etc.), the size of the business (number of employees, sales volumes, etc.), the facility type (privately owned, branch, franchise, etc.), the number of years in business, etc. These forms may be specific to the business category, and in the case of golf courses, for example,—the forms may include requesting the names and contact information for the General Manager, Head Golf Professional, Greens Superintendent, Pro Shop Manager, the number of rounds played annually, number of rounds played per month in peak season, etc. and the address of the business office. If the business office location is different from that of the POI, which for example occurs when the wine tasting room is off-site from the main winery, a map of the entered business office is presented for location verification and correction, as described above. As with the POI location, geo-coordinates for the commercially oriented business office are stored.

At the end of the data collection process, all collected information, including maps of all the locations, is presented for review and editing 1311. Review and editing are followed by a billing and payment process 1312.

The Change Existing Listing path 1314 near the top of FIG. 13, starts with a business contact verification step 1315, followed by any changes or updates to the business contact 1316. This is followed by a retrieval of the set of the latest, filled-in data collection forms that were used to first create the POI listing, as described in the Add a New Listing path 1303. The existing data is presented for review and updating by the business contact 1317. This includes the relocating of any map location markers 1311.

The order in which the various types of information are gathered in the process outlined in FIG. 13 is not critical.

A portion of the processes in FIG. 13 are also used by the managers of "POI associated program" businesses to enter or update details on their program for each POI with a few variations. The "POI associated program" manager selects and identifies each participating POI to which an association will be established from the centralized POI database listings 103. Since the geo-locations of the POI's are controlled (positioned) by the POI managers, the geo-coordinates assigned to each "POI associated program" record are linked to the POI database records. The geo-coordinates downloaded with the "POI associated program" records are extracted from the POI records, ensuring that both are located to the same geo-coordinates on the map. It should be noted, that in some cases, the POI manager and the "POI associated program" manager can be one and the same. For example, golf instructors working out of a golf course, may have their own information profile containing for example, lesson rates, a personal email address or phone number, areas of specialization, etc., and may also be the person responsible for maintaining the course information appearing on the map.

Figure 17:
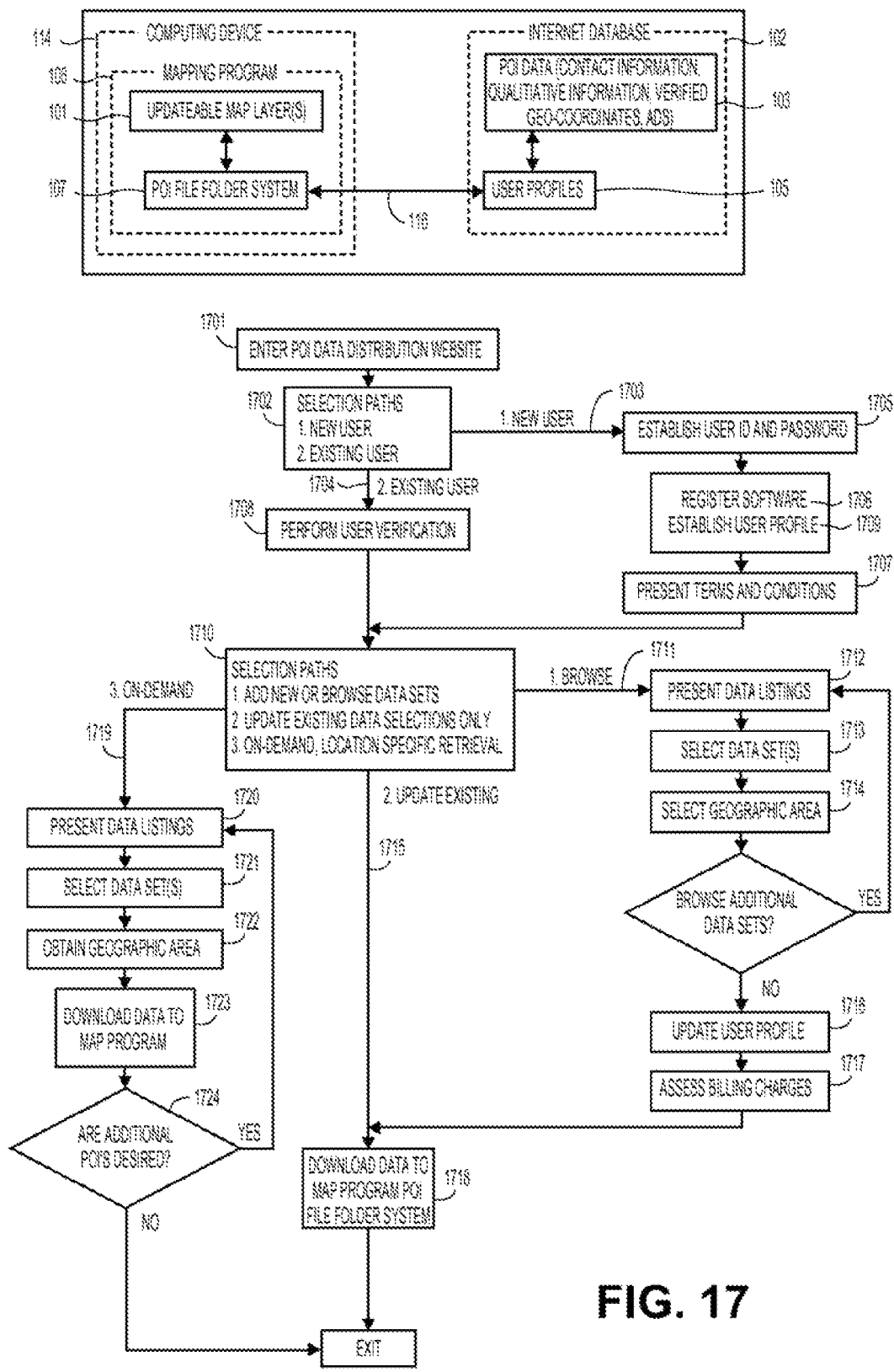
FIG. 17 is a flow diagram of the processes for downloading POI's from a centralized Internet based website into a mapping program.

FIG. 17 shows a flowchart of the processes for downloading POI information from a centralized, Internet-based website 102 to a mapping program 106 with updateable POI layers 101. Upon entering the website at step 1701, the user is identified at step 1702 as either an existing user at step 1704, that is someone who has previously visited the website and has registered their mapping application software, or a new user at step 1703. New users at step 1703 are required to establish a user ID and Password at step 1705, and register their mapping application software at step 1706. The new users at step 1703 may have purchased the mapping program software prior to visiting the website, and the purpose of their visit may be to register the software at step 1706 and to obtain their first free update of the data sets that are resident on the purchased software. The data set or sets that are resident on the purchased software, golf courses in the US or wineries in California, for example, serves to establish a base user profile at step 1709. In the case where the user has not yet purchased one of these "starter CD's" containing the basic mapping application program 106 and a resident updateable data set, he can do so by placing one in his shopping cart, as part of the registration process.

New users, and existing users who have completed the user verification process at step 1708, are presented with an overview of the data sets and geographic areas in their current user profile. At this point they can choose to either proceed to download updates for their current data set selections at step 1715, or choose to add to, revise or renew subscriptions, or just browse the available POI data sets, by selecting the Add New or Browse Data Sets path at step 1711, or choose the "On-Demand" location specific retrieval path at step 1719 aimed at users with computing devices with limited memory space.

Users selecting the Add New or Browse Data Sets path at step 1711 are presented a listing of available data set selections in a folder format similar to that used in the Folder List column 304 of the mapping application, shown in FIGS. 3, 4 and 6, where folders are expandable to reveal lower level data set selections, and check boxes 619 are used to select the desired data sets at step 1713. With each data set selection, a geographic area at step 1714 is also selected. Users can select these geographic areas by country, state, zip code, city, area code, or by a radius around a point location, or by a custom defined area (polygon), or by combinations of these.

The combinations of data sets and territorial coverage for each make up the user profile 105. For example, a user profile 105 might be comprised of, public golf courses in North America, wineries in California and Washington, Starbuck's in the US, a particular golf discount program, five-star restaurants within 25 miles of downtown Chicago, and hardware, auto parts and liquor stores within a 15 mile radius of a particular address.

A map 1604 is displayed to draw the boundaries of any custom drawn geographic areas, and/or to confirm the center point address locations of any scribed areas by radius, using processes described above with FIG. 16. Users can access the Full Map Program by selecting the Go To Full Map button 1604 shown on FIG. 16, to use the map drawing tools to identify a geographic area for a particular selected data set.

During the process of browsing the data sets for selection or renewal 1711, any existing data set selections (old profile) may be presented for modification 1712. In cases where the user has opted to decrease the geographic coverage for a particular data set, or where a data set is not being renewed, the user may be asked whether the previously downloaded POI's, which are not being updated, should be removed from the existing map. The user can choose to either keep or delete them.

Once the POI data set selection process is completed, the user's profile is updated at step 1716 and payment is collected for any additional charges at step 1717, and the selected data sets, and any associated databases and database header updates, are downloaded at step 1718 for installation into the mapping program 106. The download includes any necessary updates to the building structures (airport terminals, shopping malls, strip malls, etc.) layer.

While this description of an embodiment has organized most of the POI's for downloading into business category listings, this is an example and should not be construed as a limitation. POI's on garage sales, festivals and shows, and discount card or coupon book programs already do not fall into the business category scheme, and it is anticipated that POI's will be available as downloadable data sets in other organized selection categories, for example by city, where a user planning to visit a particular city could select to download all available tourist related POI's for a particular city or area, including, for example, museums, nightclubs, sightseeing tours, casinos, spas, theme parks, theaters, galleries, etc. As another example, POI's may be grouped or bundled for downloading by interest, for example, camp sites, RV areas, hiking trails, and parks (national and state).

The process for downloading the commercially oriented POI data sets may use the foregoing process, with some minor detail variations, such as verifying user eligibility to access confidential information.

Table 1 shows an overview of the data fields and types of data fields associated with each POI.

TABLE 1

POI Data Record Fields

| Item | Field Description | Comment |
|---|---|---|
| A | Business Category, Main | Upper portion of the RIN key field |
| B | Business Category, Sub | Middle portion of the RIN key field |
| C | Sequential ID Number | Lower portion of the RIN key field |
| D | Basic Contact Data Fields | |
| E | Qualitative Information Data Fields | |
| F | Geo-coordinates | |
| G | Date Stamp | |
| H | Default Symbol Assignment | Identifies records shown with secondary symbols |
| I | Secondary Record | |
| J | Remove Record | Assigned at reconfiguration of user profile |
| K | User Symbol Assignment | Assigned by user |
| L | POI Folder Assignment | Assigned by user |
| M | Favorite Record Folder Assignment | Assigned by user |

The Record Identification Number (RIN) is the primary or key field, and is formed by combining the Main Business Category (code number), the Sub Business Category (code number) and the Sequential ID number in an A-B-C format. This number is unique for every POI. The Basic Contact data fields include the standard telephone book type information; i.e. name, address and telephone number, as described previously. The Qualitative Information data fields can be unique to each Main Business Category and Sub Business Category combination (A-B combination). The Geo-coordinate fields contain confirmed latitude and longitude related readings. The Date Stamp is used to identify the most current of two records having the same RIN. A Default Symbol (POI icon marker) is assigned to each POI's Business Category and Sub Business Category combination. The Secondary Record is a one bit field indicating the record is associated with a primary record, and is to be displayed with a secondary symbol (marker) 1103, 1107, 1108 as described with FIG. 11.

The Remove Record field is a one bit field and is used to identify obsolete POI records or records to be removed from the user's map database. The fields identified by items A-J in Table 1 are downloaded from the centralized Internet POI database 102 and are processed by the POI Inbox Organizer 1801, shown in FIG. 18. The last three fields in Table 1, K-M, are assigned by the user, and reside in the Map Database 1802, shown in FIG. 18. If the user had selected a different symbol (marker) 702 to represent a particular data set, as described with FIG. 7A, the new symbol assignment (code) resides in the User Symbol Assignment field (K). The folder assignment is captured (L) as are any Favorite Record folder assignments (M).

Figure 18:
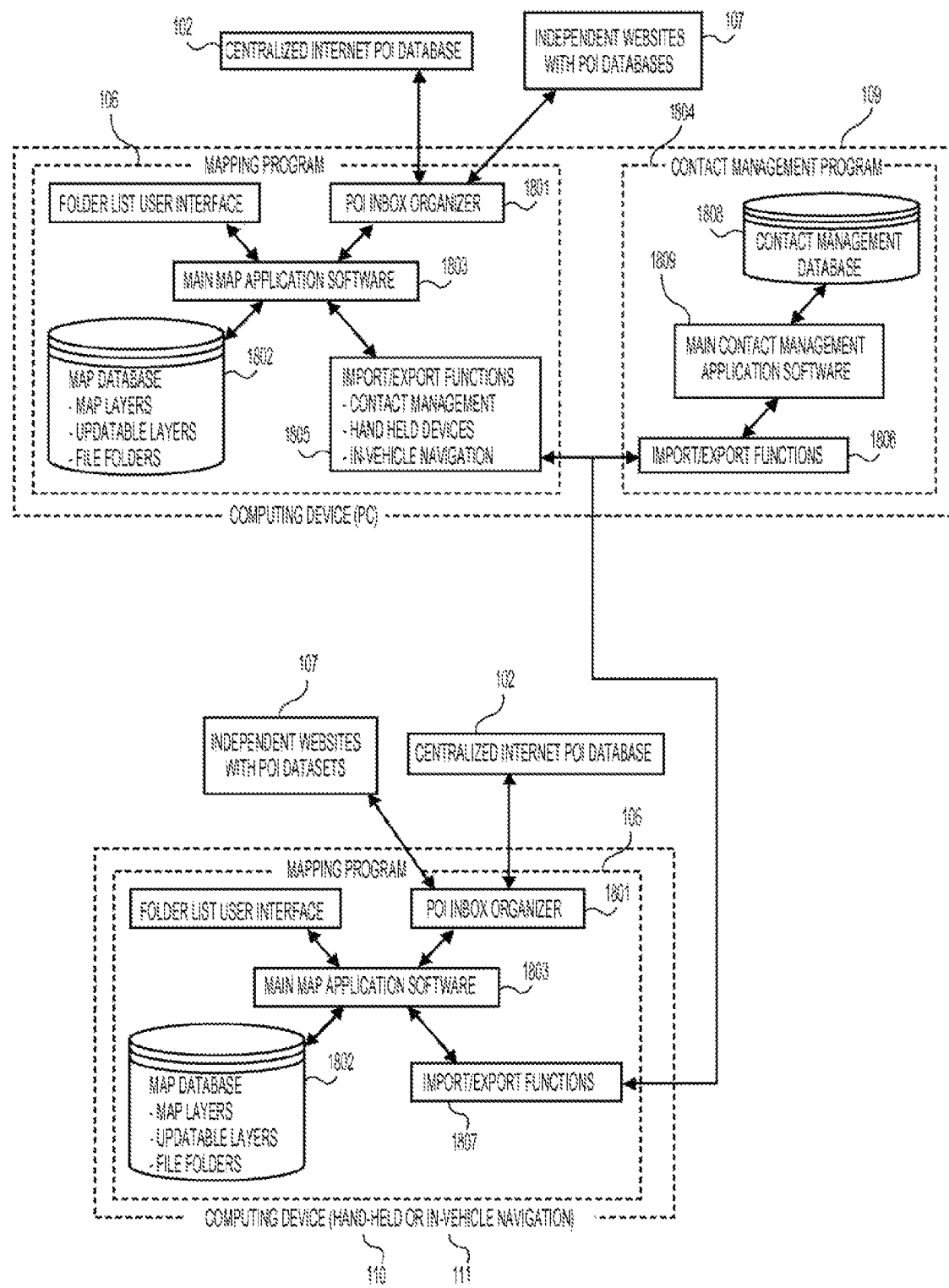
FIG. 18 contains a block diagram of the mapping program, and shows the import/export interfacing with contact management applications and mapping programs in hand-held and in-vehicle navigation systems.

Referring to FIG. 18 and Table 1, the new downloaded POI records are matched against existing (old) POI records in the Map Database 1802 by using the RIN. Data in the user assigned fields (K-M) of records with matching RIN's, are transferred to the new record, before the old record is deleted. New records, without a complete RIN match, are checked for a Business Category and/or Sub Business Category combination (A-B or A) matches against records already residing in the Map database 1802. Where matches are found, data in the User Symbol Assignment and POI Folder Assignment (K,L) fields are copied into these fields on the new records.

For example, if all of the old (or newly updated) records with the same A value, have the same symbol or folder assignment, then any new records with the same A value will be assigned the same symbol or folder assignments, respectively. New records not receiving a custom folder assignment are placed in (assigned to) the POI Inbox folder (default folder). The updated POI records are stored in the Map Database 1802 with the file folder data, layer assignments, etc. In an embodiment, the Map Database 1802 is relational database. Table 1 is presented as a flat file as an example to clearly present the data associations and relationships. The Sub Business Category (B) can itself employ a multi-tiered, hierarchical scheme to identify the sets, sub-sets and sub-sub-sets, etc. of various categories of POI's. For example, golf, golf courses, golf courses private, or restaurants, fast-food restaurants, McDonalds. Therefore, the specific arrangement of Table 1 is not required.

Additional data is downloaded from the centralized Internet POI Database 102, in conjunction with the POI record data identified in Table 1, as part of the data update process. Such data may include POI default Symbols (icon markers) for any selected data sets which are not already resident on the map program 106. For example, these might be new symbols for data sets newly added to the Centralized POI database 102. The additional downloaded data may include required updates to the field heading information for the Qualitative Information Data Fields (Table 1, Item E) for any selected data sets which were revised since the last update. For example, if any new fields were added to the qualitative information data (E) since the last update, then new heading, data type and data format information is also sent.

The additional data also may include information for displaying Global Advertisements 322 described in FIG. 3B. This includes the advertisement display pages, linking information, button nomenclature and symbols, and the Business Category assignments (Table 1, Item A, B) for any associated POI data sets which were selected for downloading. As described with FIG. 3B, the global advertising buttons 317 are displayed in conjunction with the active POI data set, therefore the global advertising information includes Business Category (A, B) assignments (relationships). Other additional downloaded data includes the building structures (airport terminals, shopping malls, strip malls, etc.) shape files.

As shown in FIG. 18, contact data can be shared between the mapping program 106 and a contact management program 1804 using the import/export functions of the mapping program 1805 or contact management program 1806. Table 2 shows a typical list of contact record fields.

TABLE 2

Contact Management Application Data Fields

| Contact Fields | Data Example |
|---|---|
| Title | |
| FirstName | John |
| LastName | Doe |
| Company | Acme Div GM Automotive |
| Department | |
| JobTitle | Director of Purchasing |
| BusinessStreet | GM Tech Center |
| BusinessStreet2 | MC 555-204-001 |
| BusinessStreet3 | 30501 Van Dyke Avenue |
| BusinessCity | Warren |
| BusinessState | MI |
| BusinessPostalCode | 48090 |
| BusinessCountry | United States of America |
| Latitude | 42.51792 |
| Longitude | −83.03566 |
| Matched to | Confirmed Location |
| Date Stamp | Feb. 28, 2004 |
| HomeStreet | 1234 University Dr |
| HomeStreet2 | |
| HomeStreet3 | |
| HomeCity | Pontiac |
| HomeState | MI |
| HomePostalCode | 48342 |
| HomeCountry | United States of America |
| Latitude | 42.65861 |
| Longitude | −83.2561 |
| Matched to | Street Address |
| Data Stamp | Feb. 28, 2004 |
| BusinessFax | |
| BusinessPhone | (555) 555-1234 |
| BusinessPhone2 | |
| CarPhone | |
| CompanyMainPhone | |
| HomeFax | |
| HomePhone | (555) 555-5678 |
| HomePhone2 | |
| MobilePhone | (555) 555-9101 |
| OtherPhone | |
| Pager | |
| PrimaryPhone | |
| EmailAddress | johndoe@aol.com |
| EmailDisplayName | John Doe (johndoe@aol.com) |
| Email2Address | |
| Email2DisplayName | |
| Email3Address | |
| Email3DisplayName | |
| Location | |
| Notes | GM Tech Center, MC 555-204-001 |
| POBox | |
| Spouse | Barbara |

In this example, non-bolded fields are available from Microsoft's Outlook program. The bolded fields; Latitude, Longitude, Matched to, and Date Stamp, however, are unique to any currently available contact management application program. In an embodiment, these fields are added to the contact records in the contact management application program 1804, however, benefits can still be realized without adding these fields to the contact management application software, as will be explained.

As contact records without stored geo-coordinates are imported into the mapping program, their addresses are geo-coded to the map, and the matching status is captured by the mapping program 106. Table 3 shows a list of possible Matched to status values or states.

TABLE 3

"Matched To" Field Options

| "Matched to" Status | Description |
| --- | --- |
| Street Address | Matched to Street within Street Number Block |
| Street | Matched to somewhere on the Street |
| City | Matched to geo-center of City |
| Zip Code | Matched to geo-center of Zip Code |
| State | Matched to geo-center of State |
| Country | Matched to geo-center of Country |
| Confirmed Location | Manually located to correct location |
| Approx Location | Manually located to approximate location |
| Area | Manually located to general area |
| Manual | Manually located accuracy unknown |
| Skipped | Matching attempted, no option selected |
| Unmatched | Matching not attempted |

The non-bolded status values are typically found in commonly available business or travel mapping programs such as Microsoft's MapPoint or Microsoft's Streets and Trips programs. As an address is geo-coded, it can be mapped to a street address, or a street, or a zip code, etc. based on the effectiveness or completeness of the Address Coding Guide (ACG) of the mapping program. As described in the background section above, an ACG consists of sets of files that provide city, state, and zip code data needed to locate addresses. It also contains street segment information that includes the street name and starting and ending house number for both odd and even numbered sides of the street. The ACG also contains information designed to compensate for the fact that addresses, address abbreviations, locality names, and so on, have many variations, and that some streets may be referenced by more than one name. It generally contains a spell correction program to fixes errors such as one letter differences, extra spaces, missing spaces, transposed characters, etc. The ACG also incorporates an address-match strategy which can be set from aggressive to conservative.

As each address is geo-coded, the map program either makes the match entirely on its own, recording the "matched to" status, or it offers various map choices to the user when a single best acceptable match can not be found, which also occurs when the ACG is not able to discern between multiple matches of near equal acceptability. The user choices may include matching the address to one of a number of complete street addresses, or streets, or cities (and state), or a zip code, etc.

In one embodiment, the user is given the option of moving the push-pin manually after selecting one of the presented choices, with an operation similar to that described above with FIG. 16. If the marker is moved, the user is requested to record the relative accuracy of the selected location by choosing one of the "manually located" selections in Table 3, which includes the bolded selections (Confirmed Location, Approx Location, Area) and the "Manually located accuracy unknown" selection. In one embodiment, the default selection is Confirmed Location. The "matched to" status 1901 can then be selected to appear as one of the pieces of displayed information in the contact information box 1902. Knowing how accurately a contact marker has been located on the map can be of particular benefit to a user who is planning to visit a contact person or business.

The date that each address is mapped is recorded in the Date Stamp field. A separate Latitude, Longitude, Matched to, and Date Stamp value is associated with each address in the contact's record, as shown in Table 2. If the contact marker is later relocated (moved on any particular map), the new location (geo-coordinates), "match to" status and date stamp fields are updated. As records are passed back and forth between the mapping program and the contact management program, the "matched to" and date stamp fields can be used to determine which set of geo-coordinates to retain.

Figure 19:
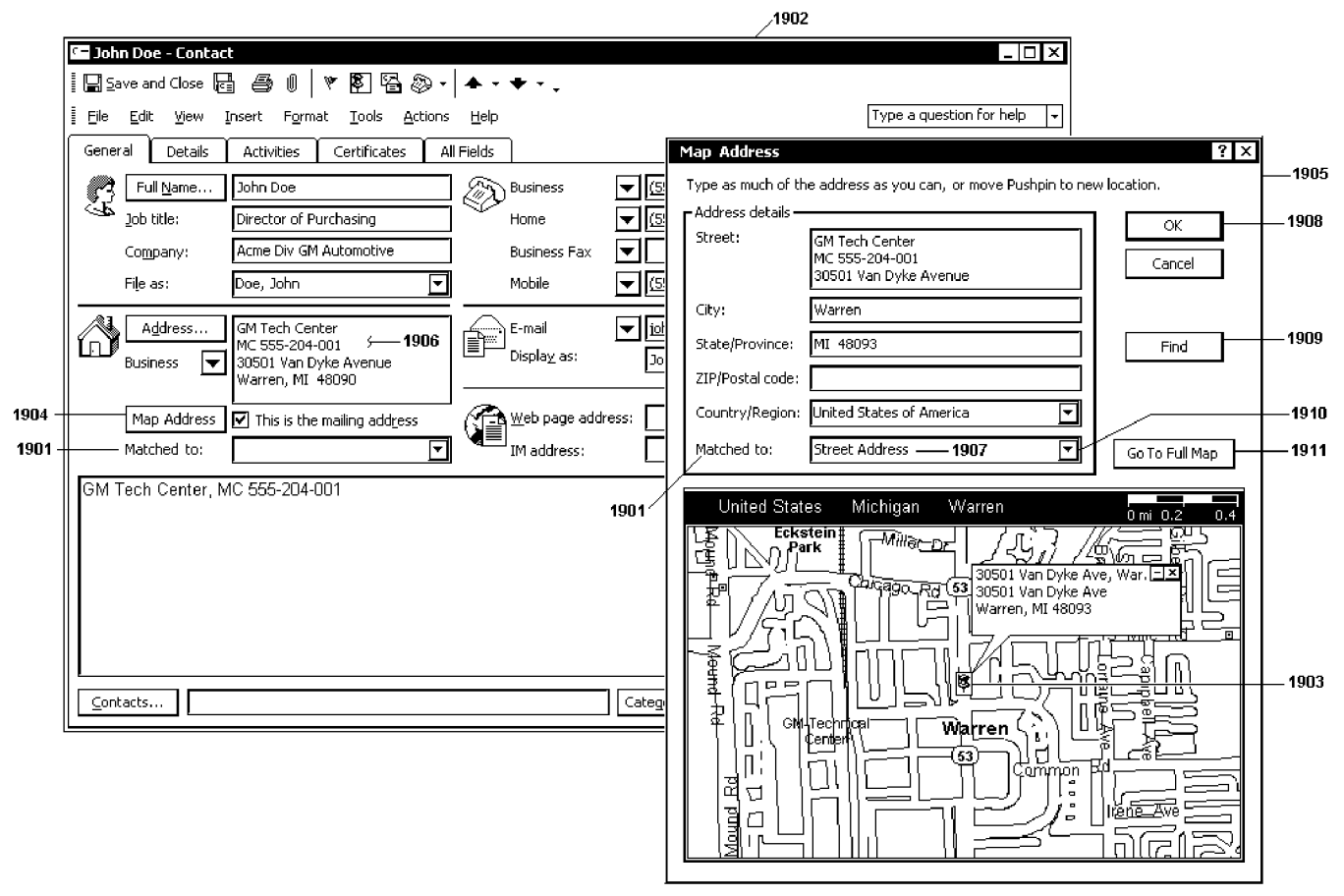

FIG. 19 shows an example of a contact record. In the improved application, a Map Address button 1904 and Match To information box 1901 are added to the contact information display 1902, allowing any entered address to be viewed on a map using the same dialog box 1905 as described in FIG. 16. As a new contact record is created and an address is entered 1906, the dialog box 1905 is displayed to confirm the location of the entered address. In the example shown in FIG. 19, the address is mapped to the street address 1907.

If acceptable, the user can press the OK button 1908 and the "matched to" status 1901 is recorded. If not, the user has the option of entering a different address and pressing the find button 1909, or he can manually relocate the push-pin 1903 and select one of the "manual" matched to status's 1910, or he can jump to a full map program 1911 having additional navigation controls and drawing functions. As mentioned above, in the preferred embodiment, the bolded fields, shown in Table 2, are added to the contact records in the contact management application program. Then, when contacts are imported to the map program, they are mapped using the geo-coordinates stored in the contact management record, rather than by geo-coding the address.

In the contact management program 1804, when personally created contact record files are forwarded via email to other people, i.e., business associates, friends, etc., they would include the confirmed location, geo-coordinate fields (for example, Latitude, Longitude, Matched to, and Date Stamp). The person receiving the contact record would then not need to perform a geo-coding operation on the received address, as the "Matched to" information box would in indicate this as a Confirmed Location. Each person confirms the assignment of the geo-coordinates in his personal contact record before forwarding it to associates.

The method herein of including geo-coordinates, a "matched to" status and a date stamp is applicable to sales force automation and customer relationship management (CRM) types of application programs, in addition to the contact management programs 1804, where several people in a workgroup share access to the same contact database 1808. For example, a sales department taking a call from a potential customer over the phone, would enter the customers name and address into the centralized customer database. The address is then geo-coded, and the sales person can confirm with the customer that the mapped location is correct. If it is not, the push-pin marker can be moved on the map by the sales person as directed by the customer over the phone, as described in FIG. 16. Then, when the contact's information is forwarded to a sales person to follow-up with the customer, the forwarded contact record would include the geo-coordinates, showing the customers exact, confirmed location. As another example, when the sales person visits the customer, he can verify and correct the customer's location by manually relocating the contact marker on his map. The new geo-coordinates are then forward back to, or synchronized with, the companies centralized customer database 1808, along with the other customer contact call information.

The synchronization techniques employed by sophisticated sales force automation and customer relationship management programs utilize methods to ensure that the most recent data within these shared records is saved, so the date stamping of the geo-coordinates and "matched to" fields may not be applicable or needed in applications employing these more sophisticated synchronization techniques.

There will be cases where the contact management program 1804 may not be capable of storing the Latitude, Longitude, Matched to, and Date Stamp fields as part of the record data. In these cases, as contact records are again re-imported into the map program 106 after having been updated in the contact management application program 1804, the imported records are matched against existing records in the map program by the primary or key fields of the contact record, before any address geo-coding is attempted. Data in the geo-coordinate, Matched to and Date Stamp fields of the records with matching primary or key fields are transferred to the newer downloaded record, before deleting the old contact record, retained in the Map Database 1802. This process is similar to that described in Table 1, where user assigned fields K-M are retained or passed on to the new, updated POI's received by the map program. This averts having to re-geo-code the addresses of any previously imported records, while retaining any efforts spent earlier to correctly confirm their locations. Only the records which were not previously imported need to be address geo-coded.

In one embodiment, independent websites 107, that is websites other than the Internet-based, centralized POI Database 102, may make POI data sets available with confirmed geo-coordinate data for downloading in a format compatible with map programs 106 having an updateable map layer 101. For example, independent websites 107 could include corporate websites providing locations of their stores, facilities or franchises, or it could include the results of an Internet, map-based search engine, like Yahoo Maps, MapQuest, or Superpages.com, for example.

In this embodiment, the POI locations information includes confirmed geo-coordinate data allowing these POI's to be mapped with improved accuracy and consistency, including places without street addresses, airport terminal gates for example. The mapping of POI's using confirmed geo-coordinates is not limited to downloading the POI data into a map program within a computing device, but applies also to positioning POI's on any Internet map-based search engine map. Today, the POI's found with these Internet map-based search engines are positioned on the Interned-based maps by geo-coding the street address. In one of the preferred embodiments, the POI's are positioned using the confirmed latitude and longitude coordinates, which are stored as part of the POI record data.

In another embodiment, the map itself, as viewed by the user on his computing device, is not be generated from one of the aforementioned search engine websites, but instead is called from a map program resident in the computing device. In this embodiment, the map itself, with all its thematic details, need not be part of the information communicated over the internet to the display (computing) device, as the map is already resident in the computing device. The display coordinates of the map (centering coordinates and scaling) are shared (synchronized) between the internet site and the computing device, while POI information is downloaded to the computing device with confirmed geo-coordinates for display and positioning on the map. As the map is navigated by the user, the display coordinates of the map (centering coordinates and scaling) are uploaded to the internet site, so that POI's within the boundaries of the map can be downloaded to the computing device. The downloaded POI's can then appear on the updateable map layer. This synchronized relationship saves bandwidth and speed when navigating the map by eliminating the need to download large raster images from the website, as the map is re-drawn by the computing device from commands sent by the internet site.

FIG. 18, shows that the POI data sets from a Centralized Internet POI Database 102 or from Independent Websites 107 can just as easily be downloaded directly into a handheld palm or pocket PC type computing device 111, personal digital assistant (PDA), or to an in-vehicle navigation system 110 with updateable map layer(s). The computing device may be any type, portable or not. In the case of a computing device with a smaller display, like a PDA, palm device or telephone, it may not be possible to display both the entire Folder List column 304 with its POI selections and the actual map area showing the location of the POI's simultaneously. In this case, the user may need to alternate between displaying the data set selections and the map.

In the case of computing devices with limited memory, FIG. 17 includes an "On-Demand" path 1719 which provides for the download and display of a more limited number of POI's, based on a specific geographic area. In this scenario for example, the user may desire to locate the nearest restaurant or golf course, using a computing device in which he has not previously downloaded any POI records. This process is similar in part to other existing processes already in use for downloading POI information specific to a local radius, however in one embodiment, the downloaded POI's are those residing in the users profile 105, and they additionally contain the aforementioned qualitative information, and pre-validated geo-coordinates.

After user verification at step 1708, the "On-Demand" path 1719 presents the user with the POI file folder listings 1720 from his previously established user profile 105. The user selects the folder or folders of interest 1721. Information on the geographic area of interest is retrieved from the computing device 1722. This can be a geo-coordinate or the center coordinate of a displayed map, and a radius based on the displayed map size or a default radius. The POI's then downloaded to the computing device are those that fall within the geographic boundaries and within the user's profile 1723. This approach pre-qualifies and limits the number of POI's which then appear in the map and which the user must sort through.

FIG. 18 also shows that the POI data which is downloaded to a PC based computing device 109 can be shared with, or downloaded to, these same hand-held devices or an in-vehicle navigation system 110, 111. In this embodiment, the main map program 1803 with capabilities of handling updateable POI map layers, is already resident in the hand-held device or in-vehicle navigation system 110, 111, just as it is in a PC-based computing device 106. One of the benefits of this configuration is that the PC-based device can act as a larger repository for the POI data sets 1802, where memory space might be limited in the hand-held or in-vehicle navigation devices 110, 111. POI data sets are selectively downloaded from the PC-based device 109 based on user needs such as travel plans. To accomplish this, the user would select the POI's to be exported from the selections the Folder List 304, mapping them temporarily, and then either selecting the export function 1805 on this program, or selecting the import function 1807 from the mapping program on the device that the POI's are to be sent to. The methods of exporting and importing of data between software applications is well known by those in the industry.

Figure 20:
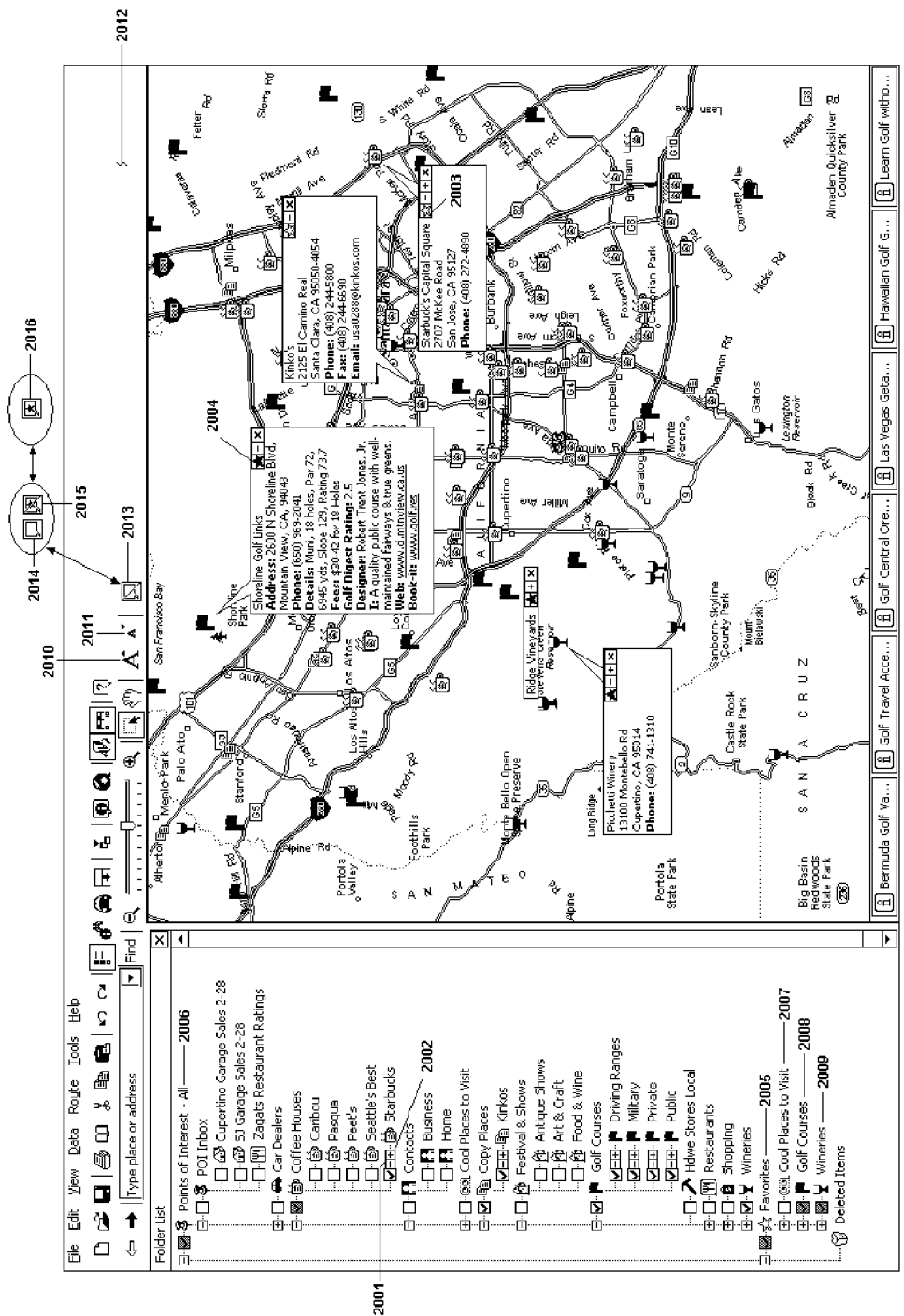
FIG. 20 shows efficiency improvements in managing larger amounts of POI information.

FIG. 20 shows an alternative embodiment that provides efficiency improvements in managing larger amounts of POI information.

In the embodiment of FIG. 20, command buttons to increase or decrease the information display level of the POI information boxes appear at the sub-folder level within the Folder List after a POI folder is selected for display on the map. In one embodiment, a first [−] command button 2001 and a second [+] command button 2002 are provided. Selecting command buttons 2001, 2002 causes the map to move or "ratchet" through the possible information display configurations of the information boxes for all POI's within that folder en masse, without the user having to open a dialog box 604 as described with FIG. 6A.

The functionality provided by command buttons 2001, 2002 is similar to that described with FIG. 4. For example, clicking on either the [+] box 414 or [−] box 416 ratchets the information display configuration up or down to the next configuration respectively. In the embodiment of FIG. 20, such an operation is performed against all the POI's in the folder. For example, a first click of the [+] command button 2002, after a POI folder is selected for display on the map, causes all POI's in the folder to be displayed with the Name Only information box, resulting in a display as depicted in FIG. 6C.

As an example, FIG. 6 uses three levels of information display, with each showing an increasing amount of information. However, alternate embodiments may provide different kinds of information in different configurations or a different order. Thus, the command buttons 2001, 2002 and boxes 414, 416 need not move sequentially among levels and need not progressively increment or decrement the amount of information shown; they may simply select different configurations of any kind or order. Any number of information display configurations of different combinations of information can be created and ratcheted through in an order set by the number assigned to each configuration.

In FIG. 20, the Mark as Favorite command 420, previously described with reference to FIG. 4, is implemented in the form of selection 2003 within an information box along with [−], [+], and [x] boxes. The [−], [+], and [x] boxes function as described above for FIG. 4. This functionality allows any POI to be quickly marked as a favorite without the user having to open the dialog box 403. In this variation of the embodiment, POI's that have been marked as favorites appear with a solid star symbol 2004, and those that have not appear as an outline of a star 2003, making it extremely easy to both identify and mark POI's as favorites.

In another variation of the embodiment, as shown in FIG. 20, the Favorites folder 2005 resides outside the control of the main Points of Interest—All folder 2006. This allows a user to close or collapse the main folder 2006, while still being able to access and operate upon any POI's marked as favorites, such as POI's 2007, 2008, 2009. In this embodiment, any folder containing a POI that was marked as a favorite also appears under the Favorites folder 2005. This allows the user to display and control only the POI's that have been selected from the main body of POI's.

In another variation, also shown in FIG. 20, the map tool bar 2012 contains a pair of controls to allow all the settable or controllable font sizes, which includes text appearing within the information boxes, and text used on the street map, to be increased or decreased. This functionality enables the user to avoid having to open a dialog box and drill down to a lower control level, which is often a three-click operation. In one embodiment, a large "A" with an up cursor 2010 causes the map system to ratchet the font size up a level, and the smaller "A" with an down cursor 2011 ratchets it down. The operation requires no selecting of any text or specific area of operation to be enacted upon. The operation is easily accessible as the controls are conveniently positioned on the map toolbar 2012.

In another variation, map toolbar 2012 contains commands to temporarily hide any open information boxes, which block the viewing of the street information and POI symbols appearing on the map. This functionality is different from the previously described information level control commands or the information close function in that it only temporarily hides the information boxes to view the street map. POI symbols are still displayed on the map.

In an embodiment, the POI information box hide function has three states. One state shows all POI labels, a second state shows only labels for POI's marked as favorites, and a third state hides all labels, both for favorite and non-favorite POI's. Clicking on the hide labels icon 2013 causes the system to hide or remove all of the non-favorite POI information boxes from being displayed. At the same time, the hide labels icon 2013 is replaced by the pair of circled icons 2014, 2015.

From this state, the show all labels icon 2014 can be selected, which would return the map to the previous state, or the hide favorite labels icon 2015 can be selected, which would remove all the labels (information boxes) from being displayed on the map, and at the same time, replace the show all labels icon 2014 and hide favorite labels icon 2015 pair, with the show favorite labels icon 2016. At this point, selecting the show favorite labels icon 2016 returns the map to the state just previously described.

In this context, the terms label, information box, and POI label, throughout this description, refer to POI information boxes, unless specifically described otherwise.

3. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method, comprising:
causing a point of interest icon to be displayed at a first location on a geographical map on a computer display;
after movement of the icon on the displayed geographical map by a user and an indication by the user that indicates that the moved icon is now located at a second more representative location for the point of interest, receiving geo-coordinate data of the second more representative location for the point of interest;
storing said geo-coordinate data of the second location of the point of interest as a database entry that is associated with said point of interest; and, thereafter,
providing the second location geo-coordinate data of the point of interest through the internet to a plurality of map display programs for display on a plurality of displays associated with a plurality of computers.

2. The method of claim 1, wherein the database entry for said point of interest is made by a trusted party, wherein a trusted party comprises a manager or owner of the point of interest, or authorized individual, or otherwise trustworthy person.

3. The method of claim 2, wherein the database entry geo-coordinate data of the point of interest is configured such that it may be updated only by a trusted party.

4. The method of claim 1 wherein the icon has the form of a push-pin.

5. The method of claim 1 wherein the icon has a form suggesting movability.

6. A method, comprising:
receiving from a first source, first information regarding a point of interest;
receiving from a second source that is different than the first source, second information regarding said point of interest;
causing, to be displayed, on a display screen of the computing device, concurrently on a geographical map, the first point of interest comprising information from said first and said second sources;
after causing the point of interest to be displayed, creating or updating a database entry associated with said point of interest comprising information from either one or both of said first or said second sources; thereafter,
updating a first map layer independent of a second map layer, wherein the first map layer comprises points of interest and the second map layer comprises a geographical map; and, thereafter,
causing the display on a plurality of displays of said first and said second map layers.

7. The method of claim 6, wherein said first information received from the first source is comprised of a location address of a point of interest, and the second information received from the second source is comprised of geo-coordinate data for said point of interest.

8. A method, comprising:
receiving from a first source, first information regarding a first set of points of interest;
receiving from a second source that is different than the first source, second information regarding a second set of points of interest;
creating or updating database entries associated with said first and said second sets of points of interest comprising the information received regarding the first and said second sets of points of interest;
updating a first map layer independent of a second map layer, wherein the first map layer comprises points of interest data from said database and the second map layer comprises a geographical map; and, thereafter,
causing the display on a plurality of displays said first and said second map layers.

9. The method of claim 8, wherein said updating step comprises selectively updated the first map layer with point of interest data associated with selected sets of points of interest.

10. A method comprising:
providing first and second points of interest data sets;
receiving update data with respect to said first or second point of interest data sets to create first or second update point of interest data sets; and
selectively providing said first or second update point of interest data sets to a computer configured to display a map from one or more map layers, including at least a geographical map layer and a point of interest map layer; wherein
the computer is configured to selectively obtain the data for said point of interest map layer from first and second point of interest data sets associated with said computer; and further wherein
said computer is configured to store said first or second update point of interest data sets into a corresponding one of said first and second point of interest data sets associated with said computer;
wherein said configured computer displays the map from one or more map layers, including at least a geographical map layer and a point of interest map layer.

* * * * *